United States Patent
Pisek et al.

(10) Patent No.: US 9,787,470 B2
(45) Date of Patent: Oct. 10, 2017

(54) METHOD AND APPARATUS OF JOINT SECURITY ADVANCED LDPC CRYPTCODING

(71) Applicant: Samsung Electronics Co., Ltd., Suwon-si, Gyeonggi-do (KR)

(72) Inventors: Eran Pisek, Plano, TX (US); Shadi Abu-Surra, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 123 days.

(21) Appl. No.: 14/563,865

(22) Filed: Dec. 8, 2014

(65) Prior Publication Data

US 2016/0013931 A1   Jan. 14, 2016

Related U.S. Application Data

(60) Provisional application No. 62/024,808, filed on Jul. 15, 2014, provisional application No. 62/023,655, filed on Jul. 11, 2014.

(51) Int. Cl.
*H04L 9/06* (2006.01)

(52) U.S. Cl.
CPC ........ *H04L 9/0631* (2013.01); *H04L 2209/24* (2013.01); *H04L 2209/34* (2013.01); *H04L 2209/80* (2013.01)

(58) Field of Classification Search
CPC ............... H04L 9/0631; H04L 2209/80; H04L 2209/34; H04L 2209/24; H04L 9/0618
USPC .......................................................... 380/28
See application file for complete search history.

(56) References Cited

U.S. PATENT DOCUMENTS

| | | |
|---|---|---|
| 2009/0041236 A1 | 2/2009 | Gligoroski et al. |
| 2010/0202608 A1* | 8/2010 | Furuhashi ............. H04L 9/0894 380/44 |
| 2012/0051443 A1 | 3/2012 | Kim et al. |
| 2013/0051556 A1 | 2/2013 | Myung et al. |
| 2013/0254617 A1* | 9/2013 | Shinohara ........... H03M 13/036 714/752 |
| 2014/0016720 A1 | 1/2014 | Ko et al. |

FOREIGN PATENT DOCUMENTS

EP    2 469 746 A1    6/2012

OTHER PUBLICATIONS

International Search Report dated Oct. 21, 2015 in connection with International Application PCT/KR2015/007196; 8 pages.
Written Opinion dated Oct. 21, 2015 in connection with International Application PCT/KR2015/007196; 4 pages.

* cited by examiner

*Primary Examiner* — Baotran N To

(57) ABSTRACT

A JSALE encoder includes a first encryption layer to apply a first encryption key to a plaintext input data. The JSALE encoder includes a row encoding module to: generate parity bits of a current layer of an H-matrix by applying a LDPC encoding process to the encrypted input data, and generate a cryptcoded data appending the parity bits to the encrypted input data. The JSALE encoder includes a second encryption layer to initiate each subsequent round of the JSALE process through round Nr and to output a ciphertext after the Nr round.

29 Claims, 14 Drawing Sheets

|  | Column 0 | Column 1 | Column 2 | Column 3 | Column 4 | Column 5 | Column 6 | Column 7 | Column 8 | Column 9 | Column 10 | Column 11 | Column 12 | Column 13 | Column 14 | Column 15 |
|---|---|---|---|---|---|---|---|---|---|---|---|---|---|---|---|---|
| Layer 1 Row 0 | 40 | -1 | 38 | -1 | 13 | -1 | 5 | -1 | 18 | -1 | -1 | -1 | -1 | -1 | -1 | -1 |
| Layer 2 Row 1 | 34 | -1 | 35 | -1 | 27 | -1 | -1 | 30 | 2 | 1 | -1 | -1 | -1 | -1 | -1 | -1 |
| Layer 3 Row 2 | -1 | 36 | -1 | 31 | -1 | 7 | -1 | 34 | -1 | 10 | 41 | -1 | -1 | -1 | -1 | -1 |
| Layer 4 Row 3 | -1 | 27 | -1 | 18 | -1 | 12 | 20 | -1 | -1 | -1 | 15 | 6 | -1 | -1 | -1 | -1 |
| Layer 5 Row 4 | 35 | -1 | 41 | -1 | 40 | -1 | 39 | -1 | 28 | -1 | -1 | 3 | 28 | -1 | -1 | -1 |
| Layer 6 Row 5 | 29 | -1 | 0 | -1 | -1 | 22 | -1 | 4 | -1 | 28 | -1 | 27 | -1 | 23 | -1 | -1 |
| Layer 7 Row 6 | -1 | 31 | -1 | 23 | -1 | 21 | -1 | 20 | -1 | -1 | 12 | -1 | -1 | 0 | 13 | -1 |
| Layer 8 Row 7 | -1 | 22 | -1 | 34 | 31 | -1 | 14 | -1 | 4 | -1 | -1 | -1 | 13 | -1 | 22 | 24 |

336-bit SYSTEMATIC | 336-bit PARITY

| i\j | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | -1 | 10 | 10 | 6 | 5 | -1 | 15 | -1 | 6 | -1 | -1 | -1 | -1 | -1 | -1 | -1 |
| 2 | -1 | -1 | 13 | -1 | -1 | 3 | 9 | 1 | 11 | 14 | -1 | -1 | -1 | -1 | -1 | -1 |
| 3 | 12 | -1 | 0 | -1 | -1 | 8 | 2 | 11 | 2 | 9 | 1 | -1 | -1 | -1 | -1 | -1 |
| 4 | 0 | 13 | -1 | 8 | 9 | -1 | -1 | -1 | -1 | -1 | 7 | 6 | 10 | -1 | -1 | -1 |
| 5 | 2 | 0 | -1 | 7 | -1 | -1 | 7 | 8 | 10 | -1 | -1 | 4 | 3 | 12 | -1 | -1 |
| 6 | 14 | -1 | -1 | -1 | 1 | 6 | -1 | 6 | -1 | -1 | 6 | 15 | 0 | 3 | 14 | -1 |
| 7 | -1 | 12 | -1 | 10 | -1 | -1 | -1 | -1 | -1 | -1 | -1 | -1 | 0 | 3 | 14 | -1 |
| 8 | -1 | -1 | 6 | -1 | 4 | 11 | -1 | -1 | -1 | 5 | -1 | -1 | -1 | 4 | 0 | 8 |

METHOD AND APPARATUS OF JOINT SECURITY ADVANCED LDPC CRYPTCODING

CROSS-REFERENCE TO RELATED APPLICATION(S) AND CLAIM OF PRIORITY

The present application claims priority to U.S. Provisional Patent Application Ser. No. 61/915,419, filed Dec. 12, 2013, entitled "HIGH PERFORMANCE JOINT SECRET ADVANCED LDPC CRYPTCODING", to U.S. Provisional Patent Application Ser. No. 62/023,655, filed Jul. 11, 2014, entitled "METHOD AND APPARATUS OF JOINT SECRET ADVANCED LDPC CRYPTCODING" and to U.S. Provisional Patent Application Ser. No. 62/024,808, filed Jul. 15, 2014, entitled "METHOD AND APPARATUS OF JOINT SECRET ADVANCED LDPC CRYPTCODING". The content of the above-identified patent document is incorporated herein by reference.

TECHNICAL FIELD

The present application relates generally to data encryption and decryption and, more specifically, to high performance joint security advanced low density parity check cryptcoding.

BACKGROUND

Information can be transmitted over-the-air at high data rates that exceed 1 gigabits per second (Gbps) according to cellular standards, such as Long-Term Evolution Advanced (LTE-A) standards, or to wireless standards, such as Wireless Fidelity (WiFi)/Wireless Gigabit (WiGig) standards. High data rates enable many applications such as Ultra High Definition (UHD) video, high performance interactive gaming, and the cloud computing. Users can experience an increase in computing power, battery life time, and data storage availability by using cloud computing applications. Cloud computing applications cause remotely located servers to process data externally from a user equipment, which enables the user equipment to include less internal mobile processing power. Cloud computing applications automatically store the mobile pictures and videos of the user in the cloud, which increases the data storage capacity available to the user beyond the capabilities of user equipment.

Unfortunately, intruders and eavesdroppers identified cloud computing applications as hacking opportunities and hack the data transmitted over-the-air or stored in the cloud. When a user becomes aware that personal private information stored in the cloud has been hacked or that information transmitted over-the-air to the cloud is vulnerable to hacking, that user and other people acquainted with that user may refuse to use cloud computing applications based on perception that data associated with cloud computing is unsecure. That is, hacking poses a big threat to the cloud computing concept and to the implementation of cloud computing in the marketplace.

SUMMARY

In a first embodiment, a joint security advanced Low Density Parity Check (LDPC) encryption (JSALE) encoder includes a first encryption layer to apply a first encryption key to a plaintext input data. The JSALE encoder includes a row encoding module to: generate parity bits of a current layer of an H-matrix by applying a LDPC encoding process to the encrypted input data, and generate a cryptcoded data appending the parity bits to the encrypted input data. The JSALE encoder includes a second encryption layer to initiate each subsequent round of the JSALE process through round Nr and to output a ciphertext after the Nr round.

In a second embodiment, a joint security advanced low density parity check (LDPC) encryption (JSALE) method includes initiating, by electrical processing circuitry, a first round of Nr rounds of a JSALE process by applying a first encryption layer to a plaintext input data inputted to the processing circuitry. The JSALE method includes generating, by a row encoding module, parity bits of a current layer of an H-matrix by processing the decrypted input data through an LDPC encoding process, and generating and outputting a cryptcoded data by appending the parity bits to the decrypted input data. The JSALE method includes initiating each subsequent round of the JSALE process through the Nr round and outputting a ciphertext after the Nr round.

In a third embodiment, a joint security advanced low density parity check (LDPC) decryption (JSALE) decoder for decrypting and decoding a ciphertext received from a JSALE transmitter that has common H-matrix cyclic shift values and common encryption keys is provided. The JSALE decoder includes a first decryption layer configured to initiate a first round of Nr rounds of a JSALE process by applying a first decryption to the ciphertext to output a cryptcoded data. The cryptcoded data of the first round is a last layer of the H-matrix. The cryptcoded data includes systematic bits of the last layer of the H-matrix appended to parity bits of the last layer of the H-matrix. The JSALE decoder includes a row decoding module configured to extract the parity bits of a current layer of the H-matrix from the cryptcoded data inputted to the row decoding module. The JSALE decoder includes a second decryption layer configured to initiate each subsequent round of the JSALE process through the Nr round and to output a plaintext data after the Nr round. Initiating each subsequent round includes decrementing a round index by one for each round through the Nr round.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

Other technical features may be readily apparent to one skilled in the art from the following figures, descriptions, and claims.

FIG. 7A illustrates a parity check H-matrix associated with a JSALC encoding scheme according to this disclosure;

FIGS. 7B-7C illustrate examples of a submatrix within the parity check H-matrix of FIG. 7A;

FIG. 12 illustrates an example of the JSALE Encryption/Decryption H-Matrix in the case of (Re=1);

FIG. 13 illustrates an example of a Hierarchical-Z H-matrix method according to this disclosure;

DETAILED DESCRIPTION

Figure 1:
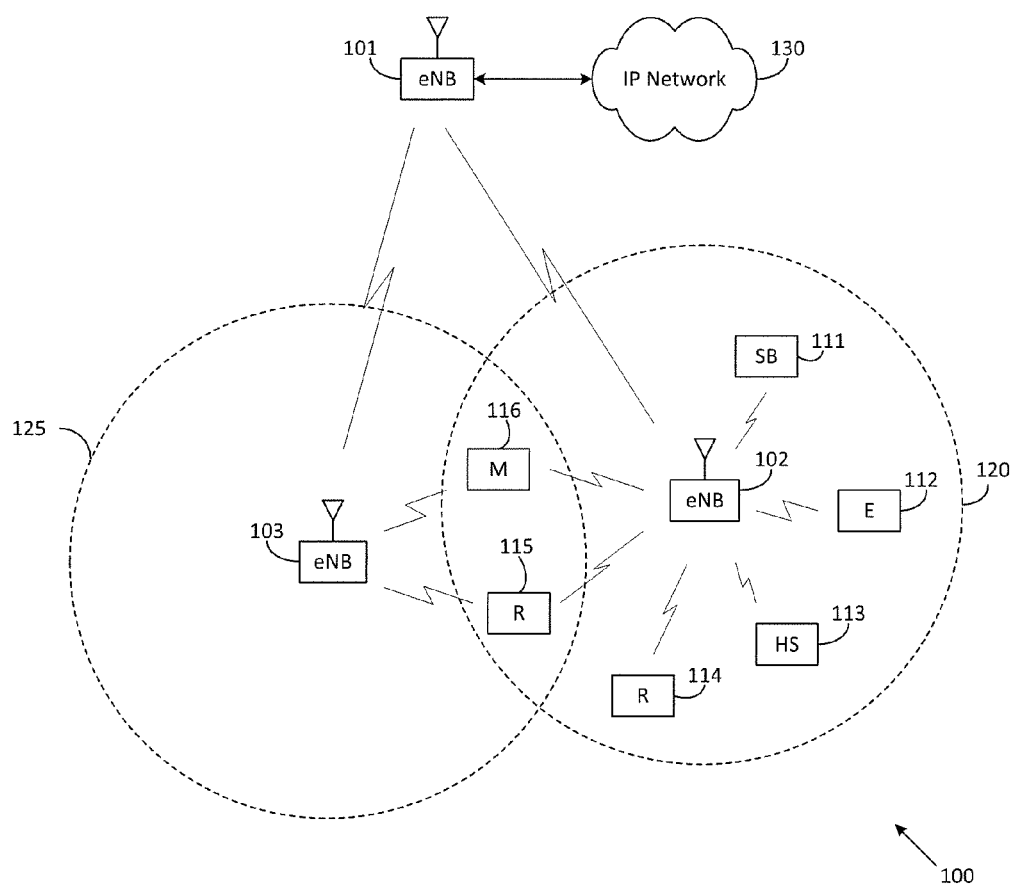
FIG. 1 illustrates an example wireless network according to this disclosure.

FIGS. 1 through 16, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated into the present disclosure as if fully set forth herein: (i) 3GPP LTE Releases 8/10/11 TSG RAN WG1, http://www.3gpp.org/RAN1-Radio-layer-1 (hereinafter "REF1"); (ii) Van Nee, R., "Breaking the Gigabit-per-second barrier with 802.11AC," Wireless Communications, IEEE, vol. 18, no. 2, pp. 4-7, April 2011 (hereinafter "REF2"); (iii) Perahia, E.; Cordeiro, Carlos; Minyoung Park; Yang, L. L., "IEEE 802.11ad: Defining the Next Generation Multi-Gbps Wi-Fi," CCNC, 2010 7th IEEE, vol., no., pp. 1-5, 9-12 Jan. 2010 (hereinafter "REF3"); (iv) B. Rochwerger et al., "The RESERVOIR Model and Architecture for Open Federated Cloud Computing," IBM Journal of Research and Development, Vol. 53, No. 4. (2009) (hereinafter "REF4"); (v) FIPS-46, "Specification for the Data Encryption Standard (DES)," Federal Information Processing Standards Publication, January 1977 (hereinafter "REF5"); (vi) FIPS-46-3, "Specification for the Data Encryption Standard (DES)," Federal Information Processing Standards Publication, October 1999 (hereinafter "REF6"); (vii) FIPS-197, "Specification for the Advanced Encryption Standard (AES)," Federal Information Processing Standards Publication, November 2001 (hereinafter "REF7"); (viii) R. McEliece, "A public-key cryptosystem based on algebraic coding theory," DSN Progress Report, vol. 42-44, pp. 114-116, 1978 (hereinafter "REF5"); (ix) R G. Gallager, "Low-density parity-check codes," Cambridge. Mass.: MIT Press, 1963 (hereinafter "REF9"); (x) D. J. C. MacKay, R. M. Neal, "Near Shannon limit performance of low density parity check codes," Electronic Letters, 1996, 32:1645-1646 (hereinafter "REF10"); (xi) E. Boutillon, J. Castura, and F. R. Kschischang, "Decoder-first code design," Proceedings of the 2nd Int'l Symposium on Turbo Codes and Related Topics, pp. 459-462, Brest, France, September 2000 (hereinafter "REF11"); (xii) T. Zhang, K. K. Parhi, "VLSI implementation-oriented (3,k)-regular low-density parity-check codes," 2001 IEEE Workshop on Signal Processing Systems, pp. 25-36, September 2001 (hereinafter "REF12"); (xiii) Baykas, T.; Chin-Sean Sum; Zhou Lan; Junyi Wang; Rahman, M. A.; Harada, H.; Kato, S., "IEEE 802.15.3c: the first IEEE wireless standard for data rates over 1 Gb/s," Communications Magazine, IEEE, vol. 49, no. 7, pp. 114, 121, July 2011 (hereinafter "REF13"); (xiv) E. Pisek, D. Rajan, J. Cleveland, "Gigabit rate low power LDPC decoder," ITW 2011, pp. 518-522, October 2011 (hereinafter "REF14"); (xv) T. Hwang and T. Rao, "Secret error-correcting codes (secc)," in *Proceedings of the 8th annual international Cryptology Conference on Advances in Cryptology*, pp. 535-563, 1988 (hereinafter "REF15"); (xvi) D. Gligoroski, S. Knapskog, and S. Andova, "Cryptcoding-encryption and error correction coding in a single step," in *Proceedings of International Conference on Security and Management*. Citeseer, pp. 1-7, 2006 (hereinafter "REF16"); (xvii) C. Mathur, K. Narayan, and K. Subbalakshmi, "High diffusion cipher: Encryption and error correction in a single cryptographic primitive," in *Applied Cryptography and Network Security. Springer*, pp. 309-324, 2006 (hereinafter "REF17"); (xviii) C. Mathur, "A mathematical framework for combining error correction and encryption," Ph.D. dissertation, Stevens Institute of Technology, 2007 (hereinafter "REF18"); (xix) H. Cam, "A combined encryption and error correction scheme: Aes-turbo," *ISTANBUL University-Journal of Electrical & Elec-* tronics Engineering, vol. 9, no. 1, 2012 (hereinafter "REF19"); (xx) O. Adamo and M. Varanasi, "Joint scheme for physical layer error-correction and security," ISRN Communications and Networking, vol. 2011, 2011 (hereinafter "REF20"); (xxi) Q. Chai and G. Gong, "Differential cryptanalysis of two joint encryption and error correction schemes," in Global Telecommunications Conference (GLOBECOM 2011). IEEE, pp. 1-6, 2011 (hereinafter "REF21"); (xxii) C. P. Gupta, S. Gautam, "Joint AES Encryption and LDPC coding," International Journal of Scientific & engineering Research, Volume 4, Issue 7, pp. 603-606, July 2013 (hereinafter "REF22"); (xxiii) J. Daemen and V. Rijmen, "The block cipher rijndael," in Smart Card Research and Applications, Springer, pp. 277-284, 2000 (hereinafter "REF23"); (xxiv) D. J. C. MacKay, "Good error-correcting codes based on very sparse matrices," IEEE Transactions on Information Theory, vol. 45, no. 2, pp. 399-431, 1999 (hereinafter "REF24"); (xxv) G. J. Sullivan; J.-R. Ohm; W.-J. Han; T. Wiegand, "Overview of the High Efficiency Video Coding (HEVC) Standard," IEEE Transactions on Circuits and Systems for Video Technology, September 2012 (hereinafter "REF25"); (xxvi) D. A. Huffman, "A method for the construction of minimum redundancy codes," Proc. IRE, 40:1098-1101, 1952 (hereinafter "REF26"); (xxvii) Nandan, S.; Deepthi, P. P.; Stuart, C. M., "Low Complex Crypto Based Channel Coding," Communication Systems and Network Technologies (CSNT), 2012 International Conference on, vol., no., pp. 863-868, 11-13 May 2012 (hereinafter "REF27"); (xxviii) Q. Su, Y, Xiao, "Design of LDPC-based Error Correcting Cipher," International Conference on Wireless, Mobile and Multimedia Networks, pp. 470-474, 2008 (hereinafter "REF28"); (xxix) S. Abu-Surra, E. Pisek, T. Henige, "Gigabit rate achieving low-power LDPC codes: Design and architecture," WCNC 2011, pp. 1994-1999, March 2011 (hereinafter "REF29"); (xxx) C. Paar, J. Pelzl, "Understanding Cryptography," Springer, 2010 (hereinafter "REF30"); (xxxi) L. Ning; L. Kanfeng; L. Wenliang; D. Zhongliang, "A joint encryption and error correction method used in satellite communications," Communications, China, vol. 11, no. 3, pp. 70-79, March 2014 (hereinafter "REF31); and (xxxii) J. Daemen and V. Rijmen, "New criteria for linear maps in AES-like ciphers," Cryptography and Comm., Springer, Vol. 1, Issue 1, pp. 47-69, April 2009 (hereinafter, "REF32").

Cellular and WiFi/WiGig wireless standards, such as LTE-A, IEEE 802.11ac, and IEEE802.11ad have increased the maximum data rate for transmissions over-the-air to exceed 1 Gbps. (See REF3). This high data rate enables many applications such as Ultra High Definition (UHD) video, high performance interactive gaming, and the cloud computing. Cloud computing in particular increases the computing power, mobile device battery life, and data storage availability beyond the capabilities of the mobile device. Data sent over-the-air or stored in the cloud can be encrypted using different encryption methods such as Advanced Encryption Standard (AES). (See REF7). However, AES is a byte-wise encryption that is vulnerable to different attacks such as square attacks (also referred to as byte-based attacks). That is, the AES encryption method encrypts data in a byte-by-byte manner, which has a granularity of 8-bits per byte. Higher security encryption methods can be applied to the over-the-air transmissions; however, increases in encryption security levels correspondingly increase the encryption/decryption complexity. As data rates increase, using the current encryption methods will significantly increase the power consumption attributable to encryption.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, the embodiments of the present disclosure implement High Performance Joint Security Advanced Low Density Parity Check (LDPC) Cryptcoding. In certain embodiments, one or more of eNB 101, eNB 102 and eNB 103 is configured to implement High Performance Joint Security Advanced LDPC Cryptcoding.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
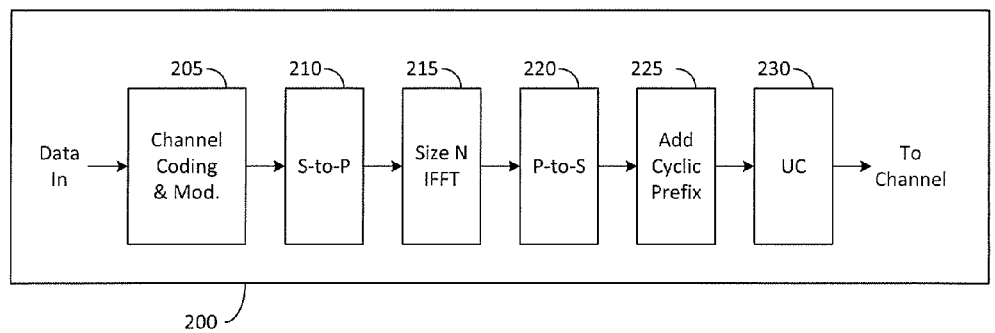
FIGS. 2A and 2B illustrate example wireless transmit and receive paths according to this disclosure.
Figure 2B:
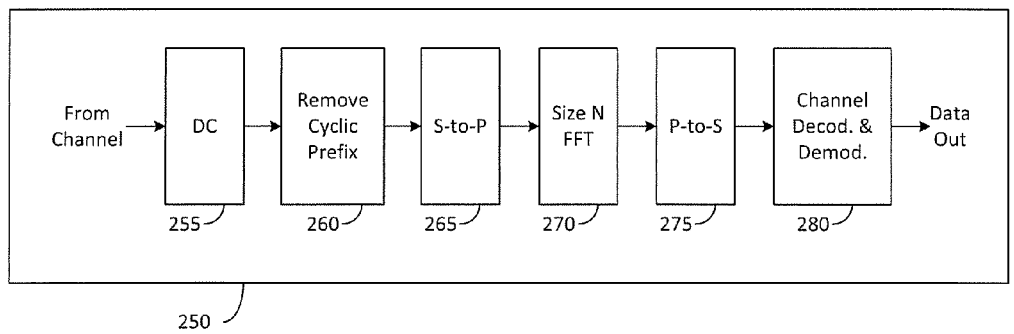

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to implement High Performance Joint Security Advanced LDPC Cryptcoding (JSALC).

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
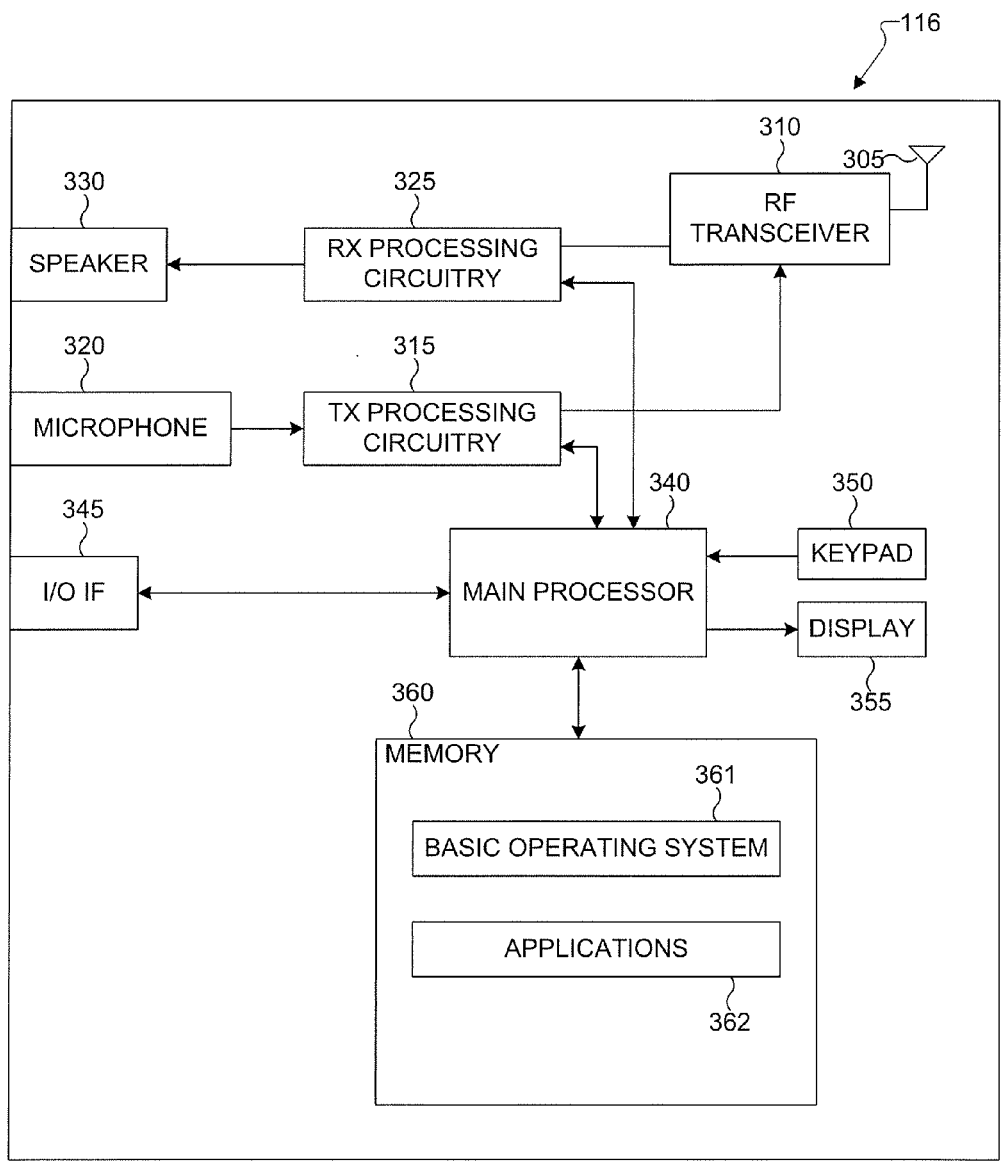
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for implementing High Performance Joint Security Advanced LDPC Cryptcoding (JSALC). The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
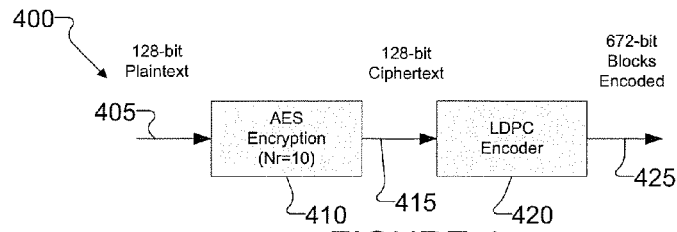
FIG. 4 illustrates a device configured to encrypt data and to encode the encrypted data according to this disclosure.

FIG. 4 illustrates a device configured to encrypt data and to encode the encrypted data according to the present disclosure. Although certain details will be provided with reference to the components of the encoder 400, it should be understood that other embodiments may include more, less, or different components.

The encoder 400 includes an encryption module 410 and an encoding module 420. In the encoder 400, the encryption module 410 is a separate module from the LDPC encoding module, not integrated with the encoding module 420. The encryption module 410 includes electrical processing circuitry that is configured to implement an AES encryption algorithm. That is, the encryption module 410 receives plaintext 405, such as 128-bit plaintext and generates ciphertext 415 using the plaintext 405. The encryption module 410 includes a number (Nr) of rounds, such as ten rounds. The encryption module 410 outputs the ciphertext 415 to the encoding module 420.

The encoding module 420 includes electrical processing circuitry that configured to implement an LDPC encoding algorithm. That is, the encoding module 420 receives the ciphertext 415 from the encryption module, such as 128-bit ciphertext 415 and generates encoded blocks 425, such as 672-bit encoded blocks. The encoded blocks 425 are an encrypted encoded representation of the plaintext data 405. The encoding module 420 outputs the encoded blocks 425 to a transmission module (not shown) that transmits the encoded blocks 425.

Figure 4A:
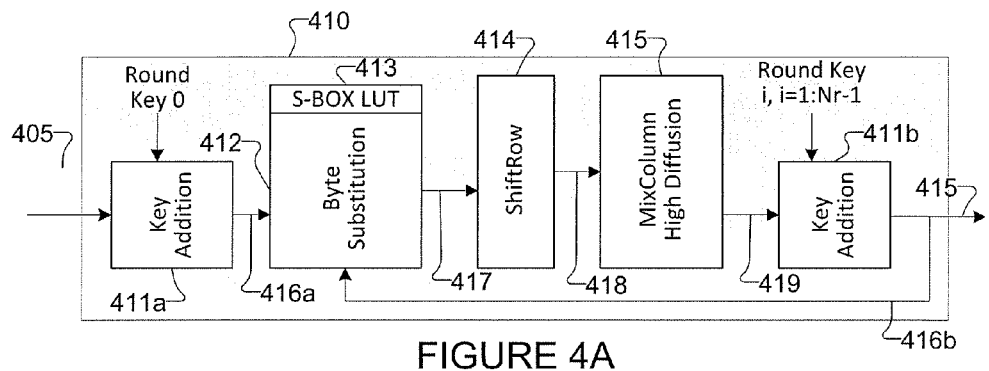
FIG. 4A illustrates the encryption module of FIG. 4.

FIG. 4A illustrates the encryption module 410 of FIG. 4. Although certain details will be provided with reference to the components of the encryption module 410, it should be understood that other embodiments may include more, less, or different components. For example, the encryption module 410 includes two key addition modules 411a, 411b, a byte substitution block 412, a look up table 413, a ShiftRow block 414, and a MixColumn block 415.

The Advanced Encryption Standard (AES) described in REF7 was officially accepted for commercial use in the early part of the 2000s decade as an enhancement to the Data Encryption Standard (DES). AES supports multiple key lengths such as AES-128, AES-192, and AES-256. According to the AES method, plaintext 405 is arranged in 128 bit blocks and input to a first round of the AES, then, the byte substitution block 412 receives the data 416a after adding the round key 0 to the plaintext data 405. (See REF7). That is, in the AES-128 implementation, the key addition module 411a receives the 128-bit plaintext data 405, and in response, adds the Round Key 0 to the plaintext data 405, wherein the Round Key 0 has a 128-bit length, and then outputs the data 416a to the byte substitution block 412. The byte substitution block 412 replaces each byte with a corresponding byte value based on look-up-table (LUT) of the multiplicative inverse value over $GF(2^8)$. The LUT 413 is referred to as an "S-BOX." The S-BOX 413 enables the byte substitution block 412 to perform a one-to-one non-linear mapping such that for A and B input bytes $S(A+B) \neq S(A) + S(B)$. The byte substitution block 412 outputs data 417 to the ShiftRow block 414 that circularly shifts the 4-bytes rows. Then, the data 418 enters the MixColumn Layer block 415 where the shifted rows data columns are transformed through a matrix multiplication. The matrix multiplication is non-binary in order to provide a high diffusion. The matrix multiplication is implemented over $GF(2^8)$. The first round ends by adding round key 1 to the MixColumn data 419. For example, the next round begins when the key addition block 411b outputs data 416b to the byte substitution block 412 for the next round. The same iterative process is applied for all the first Nr−1 rounds. While in the last round (i.e., round Nr) no MixColumn Layer function is performed. That is, when the Round Key index i=Nr−1, the MixColumn block 415 simply outputs the data 419 identical to the data 418 received, and the key addition module 411b simply outputs the data 415 identical to the data 419 received. In case of AES-128, Nr=10. In AES-192 embodiments, Nr=12, and in AES-256 embodiments, Nr=14.

Figure 5A:
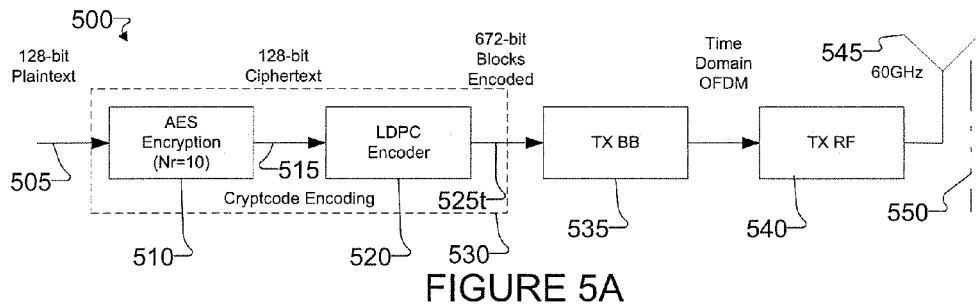
FIGS. 5A and 5B illustrate a communication system in which the encryption process and the channel coding process are processed in the same device according to this disclosure.
Figure 5B:
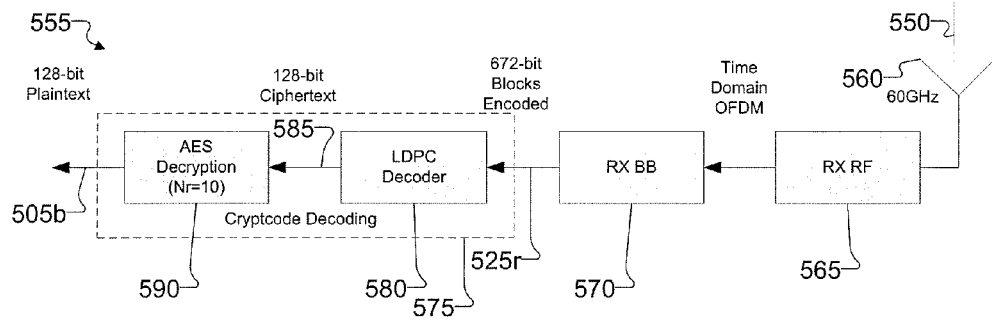

FIGS. 5A and 5B illustrate a communication system in which the encryption process and the channel coding process are processed in the same device according to the present disclosure. FIG. 5A illustrates a cryptcode encoder 500. FIG. 5B illustrates a cryptcode decoder 555. Although certain details will be provided with reference to the components of the cryptcode encoder 540 and the cryptcode decoder 555, it should be understood that other embodiments may include more, less, or different components.

Over the past few decades, solutions have been proposed to resolve the ciphering/deciphering computational complexity with minimum or no compromise to the security aspect. As one example of a proposed solution, REF8 describes cryptcoding, which combines the encryption and channel coding and enables overall lower computing complexity of the encryption and higher data rates while maintaining the security level. The main problem of the cryptcoding methods in REF8 is that the channel code complexity is significantly increased to support the encryption process. Another problem with the cryptcoding methods in REF8 is that the channel code Frame-Error-Rate (FER) performance is compromised in order to accommodate the security. Cryptcoding is feasible when a single device processes both the encryption process and the channel coding process. Specifically, cryptcoding is a procedure in which encryption and error-correction encoding are performed in a single step, additionally, cryptcoding is a procedure in which decryption and error correction decoding are performed in a single step. FIGS. 5A-5B show the proximity of the encryption/decryption process to the channel coding/decoding process, and this proximity enables cryptcoding.

The cryptcode encoder 500 includes an encryption module 510 and an encoding module 520 concatenated together to form a cryptcoding module 530. The cryptcode encoder 500 includes a transmit baseband (Tx BB) module 535, a transmit radio frequency (Tx RF) module 540, and an antenna 545, such as a transmit antenna. Note that components 510 and 520 in FIG. 5A can operate in the same or similar manner as the corresponding components 410 and 420 in FIG. 4. In certain embodiments, the Tx BB module 535 includes an Orthogonal Frequency Division Multiplexing (OFDM) baseband processor.

In the cryptcoding module 530, the encryption module 510 is integrated with the encoding module 520. That is, the cryptcoding module 530 includes electrical processing circuitry that is configured to implement an AES encryption algorithm and an LDPC encoding algorithm. That is, the cryptcoding module 530 receives a 128-bit plaintext into the encryption module 510, generates a 128-bit ciphertext 515 using the plaintext 505a according to ten rounds (Nr=10), then generates 672-bit encoded blocks 525t, and outputs the encoded blocks 525t to the Tx BB module 535. The encoded blocks 525t are an encrypted encoded representation of the plaintext data 505a.

Low Density Parity Check (LDPC) codes have an ability to achieve performance close to the Shannon limit. (See REF9). Additionally, the LDPC structure is suitable for fast and efficient parallel decoding. The main drive for reducing the code complexity was the use of Quasi-Cyclic (QC) code that adds structure to the LDPC by grouping consecutive Z bits (also referred to as the "lifting factor") in cyclic shifts form. The parity calculation is performed according to a Lower Triangular (Back Substitution) method in order to facilitate the encoding process. According to the Lower Triangular (Back Substitution) method, the encoder parity bits are obtained based on current and upper row equations. Telecommunication standards, such as the IEEE 802.11ad standard (WiGig) described in REF8, and IEEE 802.15.3c standard, utilize LDPC codes in their physical layer error control scheme.

The Tx RF module 540 is a small electronic circuit that transmits radio waves on one of a number of carrier frequencies (for example, 60 gigahertz (GHz)) using the antenna 545. The Tx RF module 540 is coupled to the antenna 545 to transmit, via the antenna 545, the encoded blocks 525t to the cryptcode decoder 555 wirelessly through a channel 550, such as an optical communication channel or RF communication channel.

The channel 550 is susceptible to interference based on the environment, and the interference can cause the encoded blocks 525t transmitted by the antenna 545 to be different from the encoded blocks 525r received at the antenna 560 of the cryptcode decoder 555. That is, interference in the channel 550 causes errors, for example, due to RF spectrum emissions, RF jamming, transmissions from non-network devices, transmissions on overlapping channels, hidden nodes, or channel congestion from too many radios sharing one channel. When the channel 550 is clear, the encoded blocks 525t transmitted by the antenna 545 are the same as the encoded blocks 525r received at the antenna 560, but may be different when the channel has interference (that is, not clear).

The cryptcode decoder 555 includes a receive antenna 560 that can receive the encoded blocks 525r, a receive RF (Rx RF) module 565, a receive baseband (Rx BB) module 570, and a cryptcoding module 575. That is, the cryptcode decoder 555 includes an LDPC decoding module 580 and an AES decryption module 590 that are concatenated to form the decryptcoding module 575.

In the cryptcoding module 575, the decryption module 590 is integrated with the decoding module 580. That is, the cryptcoding module 575 includes electrical processing circuitry that is configured to implement an AES decryption algorithm and an LDPC decoding algorithm. The cryptcoding module 575 receives 672-bit encoded blocks 525r into the decoding module 580, generates a 128-bit ciphertext 585 using the 672-bit encoded blocks 525r, then generates 128-bit plaintext 505b according to ten rounds (Nr=10), and outputs the 128-bit plaintext 505b. The 128-bit plaintext 505b are a decrypted decoded representation of the plaintext data 505a. Specifically, the 128-bit plaintext 505b is identical to the plaintext data 505a.

As another example of combining cryptography with error-correction, REF8 describes using error correcting codes for encryption, and using a public key cryptosystem by algebraic codes utilizing the same hardware used for error correction for security. All users in the system of REF8 share a set of common security parameters: n, k, t wherein there exist a binary irreducible Goppa code of length $n=2^m$ for each irreducible polynomial of degree t over GF(2'), wherein the dimension corresponds to a relationship $k \geq n-mt$, and wherein the set of common security parameters are capable of correcting any pattern of t errors or less with rate $R=k/n$.

As another example of combining cryptography with error-correction, Joint AES-LDPC codes include a private key cryptosystem that combines encryption and error correction into a single primitive. (See REF81). Like the Rijndael cipher (AES), the Joint AES-LDPC scheme is iterative. The Joint AES-LDPC encryption is composed of seven rounds, wherein the first six rounds are the same as an AES method with 6 rounds, and the LDPC encoder scheme is appended to the end of the seventh round for error correction. Hence, the Joint AES-LDPC scheme encrypts the 128-bit plaintext into 256-bit ciphertext, yielding a rate $R=\frac{1}{2}$ LDPC code. In the Joint AES-LDPC schemes like the scheme in REF81, the last 4 AES rounds are replaced with the LDPC encoding. Certain problems of the Joint AES-LDPC schemes are:

1) The error correcting LDPC code structure is aligned to the 128-bit AES, however, an ability to use higher LDPC block sizes that can significantly improve the BER performance is needed.

2) LDPC code diffusion is based on the minimum distance of the code, which is much smaller than $k=128=4^{3.5}$ plaintext size.

3) The LDPC code is a linear code and hence is vulnerable to any linear attack from a hacker. That is, the linearity of the LDPC code significantly reduces the security of the code. For a reduced rounds AES-128 cipher, when the number of rounds is Nr=6, the encrypted ciphertext has maximum bit propagation rate of $Rp=4^6$ which is much less secure than the AES-128 standard characterized by $Rp=4^9$ with Nr=10.

The Joint AES-LDPC schemes do not provide adequate security coupled with adequate performance. Particularly, the Joint AES-LDPC scheme requires high complexity due its randomness in order to realize the potential strength of the LDPC code (while combined with AES) to act as a strong cipher that has strong resistance against differential and linear cryptanalysis as well as resistance to square attacks.

Figure 6:
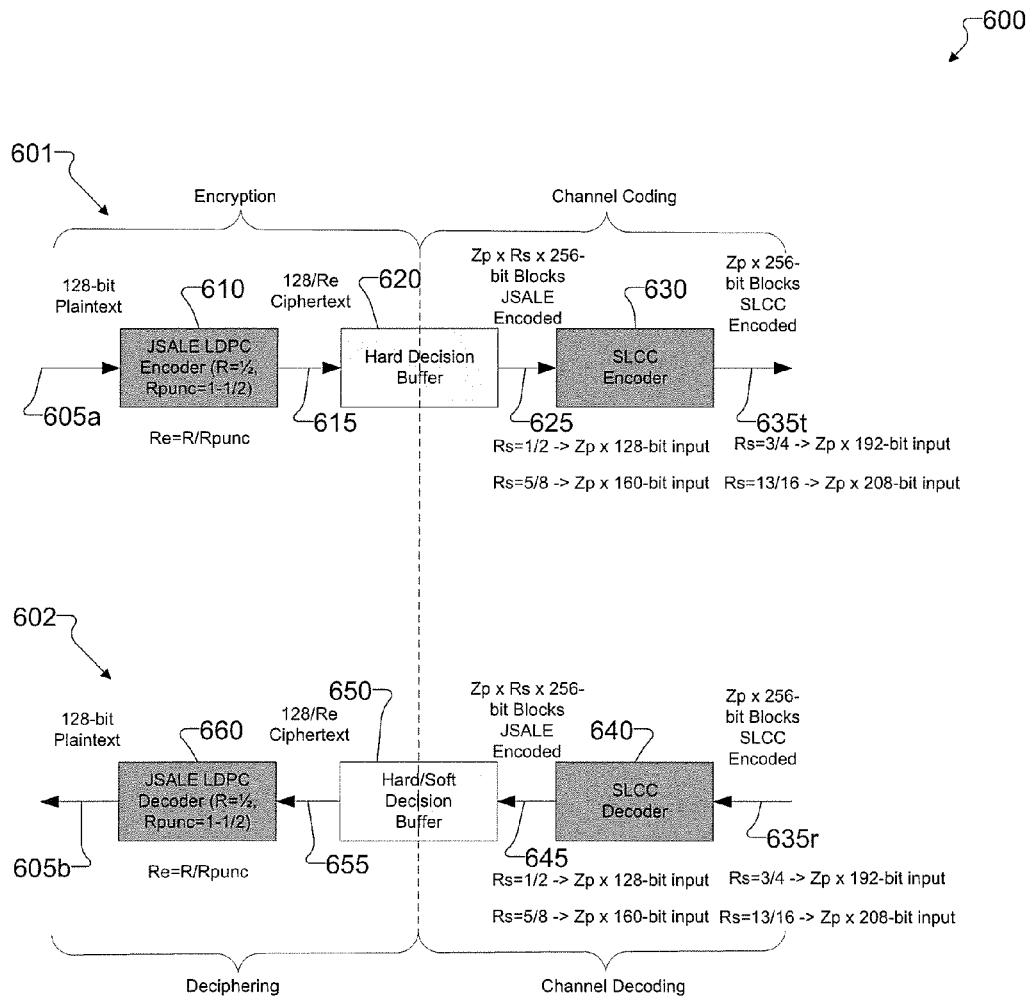
FIG. 6 illustrates a Joint Security Advanced LDPC Cryptcoding (JSALC) system according to this disclosure.

FIG. 6 illustrates a Joint Security Advanced LDPC Cryptcoding (JSALC) system according to embodiments of the present disclosure. The embodiment of the JSALC system 600 shown in FIG. 6 is for illustration only. Other embodiments could be used without departing from the scope of the present disclosure. As further described below, in comparison to the above described example of combining cryptography with error-correction, the JSALC systems and methods reduce the overall hardware complexity of the system while increasing the security level and reducing the BER of the codes. Specifically the JSALC systems and methods both provide a security level at least as high as the AES standard encryption method, maintain BER performance of any currently used channel code such as LDPC code, all with reduced complexity compared to the concatenated cryptcoding methods described above.

The JSALC system 600 includes a JSALC transmitter 601 and a JSALC receiver 602 that each implement a cryptcoding method called Joint Security Advanced LDPC Cryptcoding (JSALC) based on an LDPC code. JSALC cryptcoding method is composed of two parts: 1) the encryption part called Joint Security Advanced LDPC Encryption (JSALE); and 2) a corresponding channel coding part called Security LDPC Channel Coding (SLCC). That is, the JSALC system 600 includes an Encryption/Deciphering part (namely, the JSALE part) and a Channel Coding/Decoding part (namely, the SLCC part). Accordingly, the transmitter 601 includes a JSALE LDPC encoder 610, a hard decision buffer 620, and a SLCC encoder 630. The receiver 602 includes a SLCC decoder 640, a decision buffer 650, and a JSALE LDPC decoder 660. The hardware implementation of the JSALC transmitter 601 and JSALC receiver 602 reduce complexity and increase hardware reuse by unifying the JSALE and SLCC base H-Matrices. More particularly, the JSALE LDPC encoder/decoder 610, 660 and the SLCC encoder/decoder 630,640 share the same basic H-Matrix structure, where the difference between the JSALE encoder/decoder and SLCC encoder/decoder is that the SLCC also uses a second level lifting factor Zp that lifts the 256-bit by Zp to create a final Zp×256-bit block. The hardware implementation of the JSALE LDPC encoder 610 and decoder 660 is described in more particular detail below with reference to FIGS. 9 and 10 respectively.

In order to achieve same or higher security than the AES standard, any security system needs to have the following characteristics: a non-linear function to protect from any differential or linear attacks (for example, S-BOX), a key input of 128-bit or above to protect from any chosen plaintext attack, and a low complexity high diffusion of $4^9$ (namely, the diffusion level of the AES standard) or above. The low complexity high diffusion value is a measure of rounds based with a high diffusion (HD) function between rounds. The JSALE LDPC encoder 610 and decoder 660 implement a JSALE encryption/decryption method that incorporates all the above features.

The JSALE LDPC encoder 610 encrypts plaintext using a Quasi-Cyclic (QC) LDPC Layered encoder that encodes the plaintext sequentially. Sequentially means row-by-row from the first row to the last row. JSALE LDPC encoder 610 performs key addition, nonlinear byte substitution, and high diffusion operations between the rows. The JSALE LDPC encoder 610 uses an H-Matrix, which is described in more particular detail below with reference to FIG. 8. The H-Matrix parity part is a lower triangular to provide low complexity encoding. In certain embodiments, the encoded data is punctured by a puncture rate (Rpunc) to increase the final rate (namely, the effective rate (Re)) to Re=R/(1−Rpunc). Note that $\overline{Rpunc}$ is defined as the complementary rate of the puncture rate (Rpunc), where $\overline{Rpunc}$=1−Rpunc.

As an example, the JSALE LDPC encoder 610 receives a 128-bit plaintext data 605a, cryptcodes the data 605a, and outputs ciphertext 615 to the hard decision buffer 620. The ciphertext 615 has a length expressed as $$\frac{128}{Re}.$$

The hard decision buffer 620 outputs blocks of JSALE encoded data 625, which has a bit length expressed as Zp×Rs×256. Table 1 summarizes a relationship between the number of bits output by the SLCC encoder 610 based on the SLCC code rate (Rs). The SLCC encoder 630 further encodes the JSALE encoded data 625 and outputs blocks of SLCC encoded data 635t. The blocks of SLCC encoded data 635t have a bit length expressed as Zp×256 bits. The JSALC transmitter 601 transmits the data 635t to the JSALC receiver 602.

TABLE 1

Relationship between Rs values and final number of bits output from the JSALC transmitter based on a 128-bit plaintext input

| Rs | $Z_p \times R_s \times 256$ bits |
|---|---|
| 1/2 | 128 |
| 5/8 | 160 |
| 3/4 | 192 |
| 13/16 | 208 |

The JSALE LDPC decoder 660 deciphers ciphertext using a Quasi-Cyclic (QC) LDPC Layered decoder that decodes the ciphertext sequentially in a reverse order. In the case of the decoder 660, sequentially means row-by-row from the last row to the first row. The JSALE LDPC decoder 660 performs key addition, inverse high diffusion, and inverse nonlinear byte substitution operations between the rows. The JSALE LDPC decoder 660 uses the same H-Matrix that the JSALE LDPC encoder 610 uses.

As an example, the JSALC receiver 602 receives the data 635r from the JSALC transmitter 601. When the data 635t is transmitted over a clear channel, the encoded blocks of data 635*t* are the same as the data 635*r* received at SLCC decoder 640, but may be different when the channel has interference. The blocks of SLCC encoded data 635*t* have a bit length expressed as Zp×256 bits. The SLCC decoder 640 decodes the JSALE encoded data 635*r* and outputs blocks of JSALE encoded data 645, which have a bit length expressed as Zp×Rs×256. The decision buffer 650 receives the blocks of JSALE encoded data 645 from the SLCC decoder 640. The relationships in Table 1 also apply to the SLCC decoder 640. The decision buffer 650 outputs ciphertext 655 to the JSALE LDPC decoder 660. In certain embodiments, the decision buffer 650 is a soft decision buffer that generates a multi-bit precision LLR input to the JSALE LDPC decoder 660. In certain embodiments, the decision buffer 650 is a hard decision buffer that generates a single-bit precision LLR input to the JSALE LDPC decoder 660. Based on whether the LLR input has a single-bit precision or a multi-bit precision, the JSALE decryption processing can be hard or soft, respectively. The ciphertext 655 has a length expressed as $$\frac{128}{Re}.$$

The JSALE LDPC decoder 660 cryptcodes the ciphertext 655 to recover and output a 128-bit plaintext data 605*b*. The 128-bit plaintext 605*b* is a decrypted decoded representation of the plaintext data 605*a* such that the plaintext 605*b* is identical to the plaintext data 605*a*.

In certain embodiments, the transmitter 601 decreases the number of bits of ciphertext 615 transmitted to the receiver 602 by puncturing the H-Matrix at a puncturing rate (Rpunc) to increase the final, transmitted code rate (Re) to Re=R/(1−Rpunc). That is, the transmitter 601 punctures the H-matrix according to a puncturing pattern that is common with receiver 602. In order to decrease the bit length of the ciphertext 615, the receiver 602 shares the common puncture pattern and common H-Matrix cyclic shift values with the transmitter 601. Accordingly, the receiver 602 can decode the data using one of the Belief Propagation (BP) iterative decoding methods described in REF34. Also, the receiver 602 can decrypt/decode the data 635*r* in reverse order from last row back to the first row in each iteration. In addition, because the puncturing pattern can also be a key, by slightly decreasing the transmitted code rate to Re=dR/(1−Rpunc), the transmitter 601 can transmit dummy sets of bits over the channel, where d→1 is the dummy rate, to the receiver 602. The receiver 602 punctures the dummy bits because the common puncture patter enables the receiver 602 to know the location of the dummy bits and correctly decrypt/decode the data. Note that different puncturing patterns can be applied to provide high code rate. However, the higher the code rate the higher the number of iterations the JSALE LDPC decoder 660 will have to perform in order to correctly decode the data. Increasing the decoder number of iterations linearly increases the total decryption complexity. At the same time, increasing the iteration number of the LDPC decoder also linearly increases the cryptanalysis complexity. In addition, Maximum-Likelihood (ML) decoding of the JSALE LDPC is highly complex $O(2^{128})$, hence any brute force ML cryptanalysis is impractical.

Unlike other cryptcoding methods, the JSALE encryption part of the JSALC system 600 does not replace the channel coding of the wireless system. The JSALE is part of the encryption layer working together with the wireless system channel coder (SLCC) that is tailored to the specific wireless channel characteristics. As a result, the JSALE method has a four times higher level of security than conventional AES-128 systems all while the JSALE method provides either no or minimum impact (≤20%) on the overall data rate. The amount of impact that the JSALE method has on the overall data rate depends on the error resilience requirements of the JSALE. In addition, the Security LDPC Channel Code (SLCC) FER/BER performance fits communications standards with $E_b/N_0$<2 dB at Frame Error Rate (FER) equal to $10^{-2}$ with only a 1 decibel (dB) gap from the random coding bound (RCB). As a technical advantage, the JSALC system 600 reuses the LDPC encoder/decoder hardware resources for both JSALE and SLCC parts, thereby causing the JSALC system hardware consume an overall smaller area and to consume less power than other AES/LDPC concatenated systems such as, the cryptcoding modules 530, 575 of FIGS. 5A and 5B. In sum, the JSALC system is a higher security encryption method than other cryptcoding systems and maintains an acceptable the channel code BER/FER performance.

FIG. 7A illustrates a parity check H-matrix associated with a JSALC encoding scheme according to embodiments of the present disclosure. For example, the JSALE LDPC encoder 610 and decoder 660 can use the H-matrix 700 to perform crypcoding functions. The embodiment of the H-matrix 700 shown in FIG. 7A is for illustration only. Other embodiments could be used without departing from the scope of the present disclosure.

The H-matrix 700 is a ½ code rate H-matrix conforming to the WiGig standard, which is based on the WiGig OFDM size of 336 subcarriers per symbol (dual bits for QPSK). Also, the ½ code rate H-matrix 700 is a 672×336 matrix that represents a transmission of 672 bits per frame (bpf). Specifically, the H-matrix 700 has 672 bits per row and 336 bits per column, accordingly each frame transmission is a row from the H-matrix 700. In other embodiments, the H-matrix can have any suitable rate, such as a ⅝, ¾, or a ¹³⁄₁₆ code rate (R). Rows (1,3), (2,4) (5,7), and (6,8) are mutually exclusive row pairs that make the LDPC Rate ½ 4-Layer decodable. REF 14 describes in further detail about LDPC codes and decoder architectures and the corresponding implementation complexity.

Additionally, the H-matrix 700 shown has a block size (N) of 672 bits with a lifting factor (Z) of 42. Other embodiments of H-matrices for use with the present disclosure can have other block sizes and lifting factors. The lifting factor indicates the number Z of consecutive bits grouped in cyclic shift form. That is, a lifting factor of Z=42 indicates that the block code is grouped in 42 bits such that the block size (N=672) forms $$\frac{N}{Z} = \frac{672}{42} = 16$$

Z-group of bits. Each of the Z-group of bits forms a column such that the H-matrix 700 includes 16 columns. The first eight columns 705 represent systematic (or data) bits while the second eight columns 710 represent parity bits (or redundancy bits). As such, using the H-matrix 700, each frame transmission includes 336 systematic bits and 336 parity bits. The Z lifting factor defines the number of bits per matrix in the cyclic shift form. As a result, each of the 16 columns of the H-matrix 700 includes a number of identity matrices of size Z×Z bits, wherein each identity matrix forms a row of the H-matrix 700. The number of rows in the H-matrix 700 can be expressed as $$\frac{\text{Number of bits per column}}{Z} = \frac{336}{42} = 8$$

rows or expressed as $$R \times \text{Number of Columns} = \frac{1}{2} \times 16 = 8 \text{ rows.}$$

Each row in the H-matrix 700 forms a layer. The eight rows are indexed or numbered sequentially from 0 through 7, and the eight layers are indexed from 1 through 8.

Each number represents a submatrix that is the cyclic shifts of the identity matrix of size Z×Z bits. A '−1' value represents a zero matrix. Accordingly, the '−1' value indicates that the location is not used in the calculation. The remaining values (namely, those having values other than '−1') are location values that represent a submatrix.

Figures 7B, 7C:
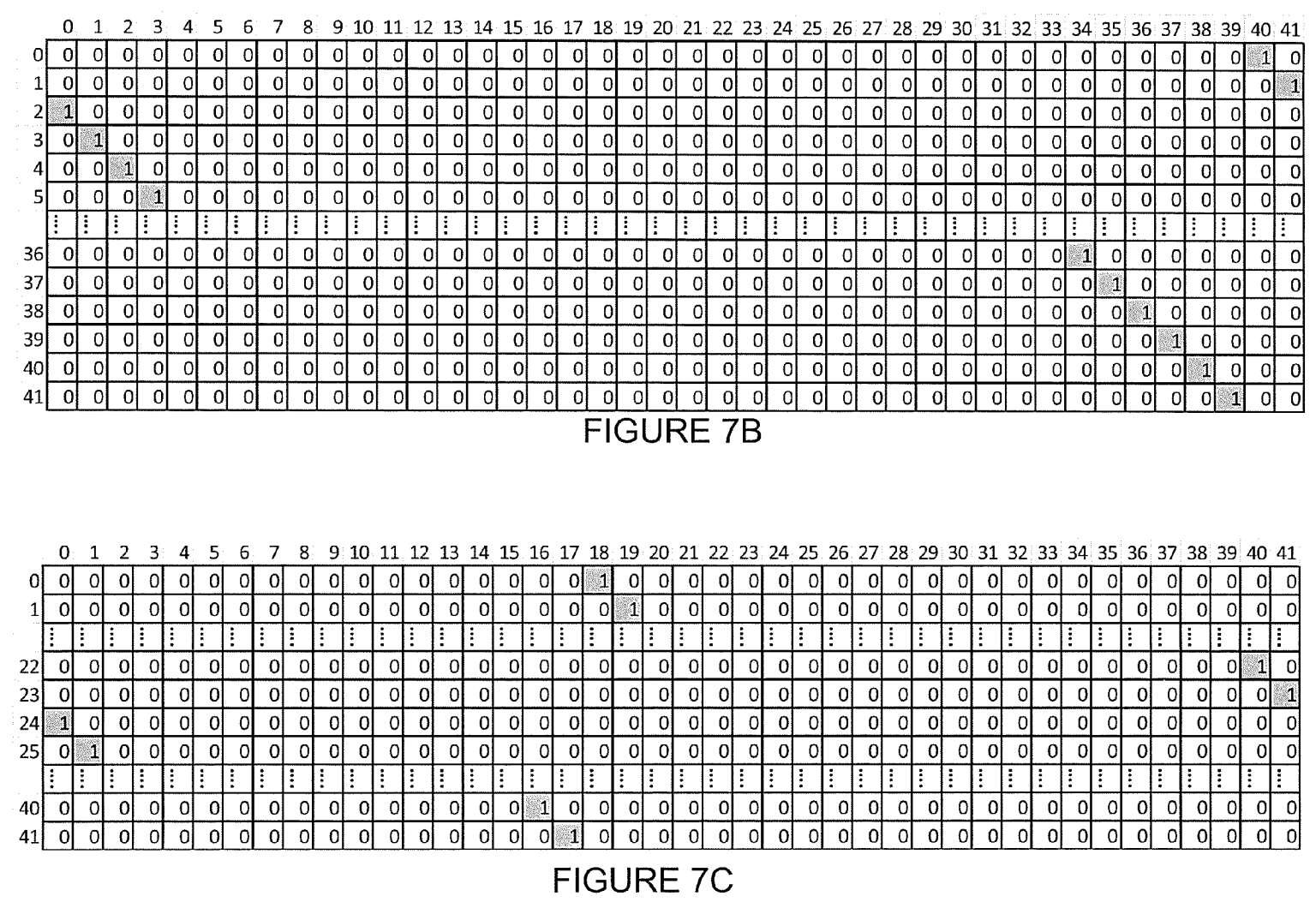

For example, in the first row (Row 0), the first column (Column 0) shows the number 40, which means that the first 42 bits are cyclically right shifted by 40 bits in the first 42 parity equations and so on for the reminder of the bits. FIG. 7B illustrates the submatrix represented by the number 40, wherein the center thirty rows are hidden from view. Specifically, in the submatrix the represented by the number 40, rows are indexed from 0 through 41, the columns are indexed from 0 through 41, and the first row includes all zeros except for in the column having a column index 40 includes a bit value of "1." Also in the submatrix the represented by the number 40, the second row (Row 1), includes all zeros except for in the last column having a column index 41 includes a bit value of "1." Also in the submatrix the represented by the number 40, the third row (Row 2), includes all zeros except for in the first column having a column index 0 includes a bit value of "1." This pattern continues for the remaining rows of the submatrix such that the last row (Row 41), includes all zeros except for in the 40th column having a column index 39 includes a bit value of "1."

As another example, FIG. 7C illustrates the submatrix represented by the number 18, wherein various rows are hidden from view. In the H-Matrix 700, the submatrix disposed in the first layer at the first column of parity bits (namely, Column 8) is represented by the number 18. In the first layer of the parity part 710 of the H-Matrix 700, all columns except the first column includes a zero submatrix. The submatrix represented by the number 18 includes parity bits generated from applying an XOR function to the first layer of systematic bits. Specifically, XOR (40, 38, 13, 5) generates the bitvalue of the Column 18 of the first row of the submatrix represented by the number 18. XOR (41, 39, 14, 6) generates the bitvalue of the Column 19 of the first row of the submatrix represented by the number 18. This process of applying the XOR function to the systematic bits 705 of each of the Z rows within Layer 1 repeats until the next layer is processed.

The subsequent layer, Layer 2, generates a first submatrix in the same column that the previous layer, Layer 1 generated a submatrix. In Layer 2, the submatrix represented by the number 2 includes parity bits generated from applying an XOR function both to the second layer of systematic bits 705 and to the previous layer parity bits. Specifically, XOR (34, 35, 27, 30, 18) generates the bitvalue of the Column 2 of the first row of the submatrix represented by the number 2. After the bitvalues have been generated for the entirety of the submatrix represented by the number 2, Layer 2 generates a second submatrix in the next column of Layer 2 by using the submatrix represented by the number 2. Specifically, in Layer 2, XOR (34, 35, 27, 30, 2) generates the bitvalue of the column 1 of the first row of the submatrix represented by the number 1. This process of generating a first submatrix of parity bits in the same column as the previous layer of parity bits and then generating a second submatrix of parity bits in the next column using a previous column of the same layer repeats until all layers have been processed.

Figure 8:
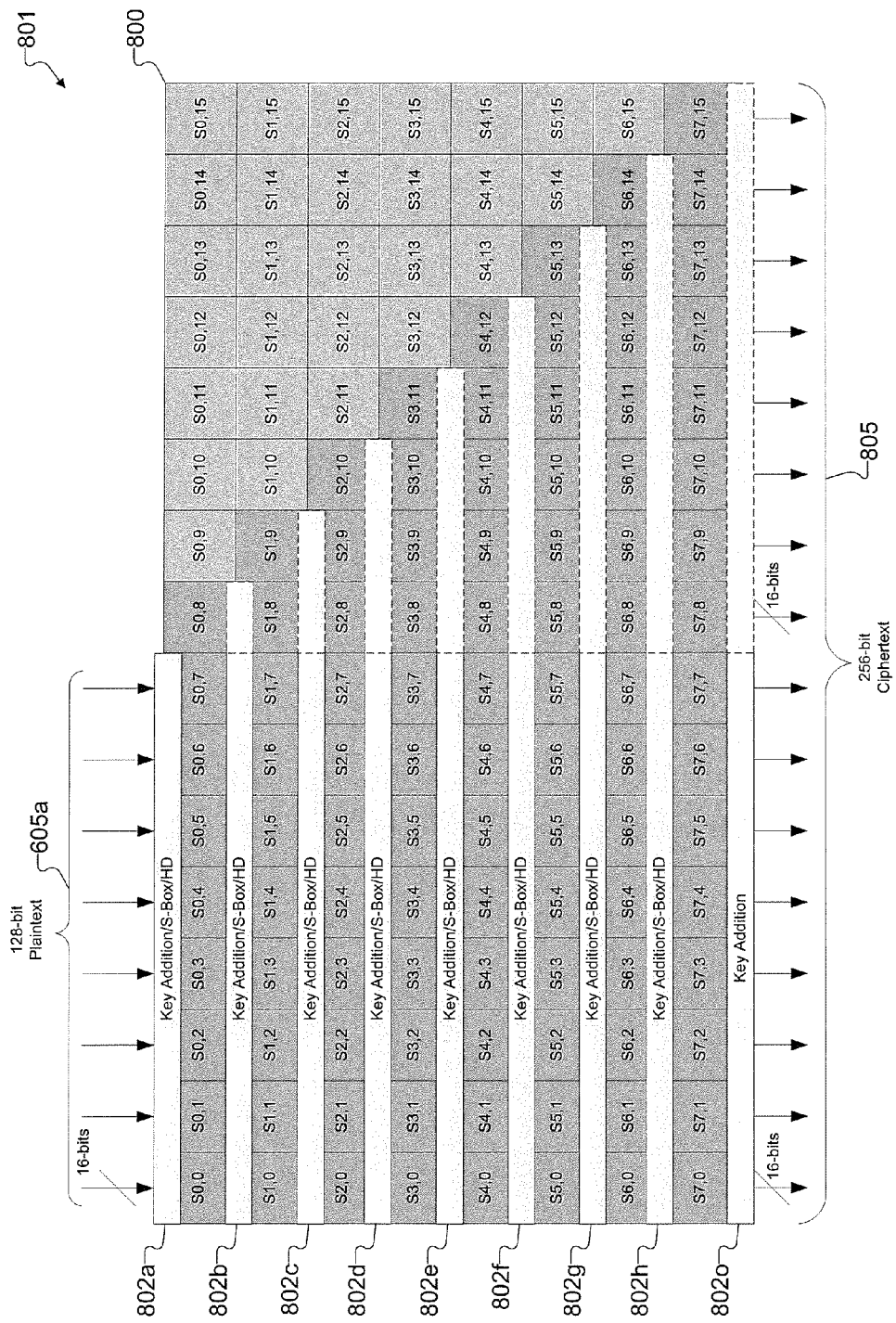
FIG. 8 illustrates a LDPC H-Matrix for the JSALE encryption process implemented by a JSALE LDPC encoder/decoder having a puncturing rate that is less than the basic code rate according to this disclosure.

FIG. 8 illustrates a LDPC H-Matrix 800 for the JSALE encryption process 801 implemented by a JSALE LDPC encoder/decoder 610, 660 having a puncturing rate that is less than the basic code rate (½) according to embodiments of the present disclosure. The embodiment of the JSALE process 801 shown in FIG. 8 is for illustration only. Other embodiments could be used without departing from the scope of the present disclosure.

The H-matrix 800 can be the same as or similar to the H-matrix 700 of FIG. 7A. Each submatrix of the H-matrix 800 is labeled "Si,j" according to a corresponding row index (i) and column index (j), wherein the row indices and column indices are each a respective set of integers from 0 to 15. For example, in the first row (Row 0) of the H-matrix 800, the first column (Column 0) is labeled "S0,0" and can represent the submatrix "40" in Layer 1 of the H-matrix 700. Likewise, the submatrices "S0,8" "S1,8" "S1,9" and S2,10" can represent the submatrices "18" in Layer 1 of the H-matrix 700, "2" in Layer 2 of the H-matrix 700, "1" in Layer 2 of the H-matrix 700, and "41" in Layer 3 of the H-matrix 700, respectively. The QC-LDPC block size is derived from a 256-bit LDPC block H-Matrix that has a rate R=½, a lifting factor Z=16, 16 columns, and 8 rows, wherein the number of columns is expressed as $$\frac{\text{Number of bits}}{\text{Lifting Factor}} = \frac{256}{16} = 16,$$

and wherein the number of rows is expressed as $$\text{Number of Columns} \times R = 16 \times \frac{1}{2} = 8.$$

JSALE LDPC encoder 610 receives the 128-bit plaintext 605a through multiple input terminals, such as an input terminal for each column of systematic bits, wherein each input terminal receives 16-bits of data in parallel. To generate the first layer of the H-matrix 800, the JSALE LDPC encoder 610 performs key addition using the first key 802a, then nonlinear byte substitution (S-Box), and then high diffusion (HD) operations using the 128-bit plaintext 605a. Next, the JSALE LDPC encoder 610 generates the parity bits for the submatrix "S0,8." That is, after the JSALC transmitter 601 encrypts the plaintext 605a applying the JSALE method to {"S0,0" . . . "S0,7"}, then the SLCC encoder 630 channel codes Layer 1 by appending the parity portion of Layer 1 using the SLCC method.

To generate each subsequent layer of the H-matrix 800, the JSALE LDPC encoder 610 performs key addition using an incrementally larger key 802b-o for each round, an S-Box operation, and HD operations between the rows. That is, to generate row i of the H-matrix 800, the JSALE LDPC encoder 610 performs key addition by applying the $i^{th}$ key 802b-o to the previous row data {"Si−1,0" . . . "Si−1,7+i"}, where i is the index for the current round (row). Specifically, to generate the second layer of the H-matrix 800, the JSALE LDPC encoder 610 performs key addition applying a second key 802b (Row 1 key) to the Row 0 data {"S0,0" . . . "S0,8"}, where i=1 for the second layer. The second key 802b is longer than the first key 802 by a number of bits. After each key addition step 802b-o, the previous row data {"Si−1,0" . . . "Si−1,7+i"} is fed to the non-linear S-Box function. Then, the previous row data {"Si−1,0" . . . "Si−1,7+i"} enters the High Diffusion (HD) function block which guarantees the 4-bit diffusion. Then, SLCC encoder 630 channel codes the current round data {"Si,0" . . . "Si,7+i"}. The iterative process continues through all the Nr=8 rounds (rows). At this point, the JSALC transmitter 601 transmits the 256-bit ciphertext 805 to the JSALC receiver 602. These 256 bits of ciphertext 805 are sent as secret key using secured key exchange. The same key is used as a seed for the 256-bit scrambler or to XOR the 256-bit encoded ciphertext 805 output. In the embodiments wherein transmitter 601 transmits the 256-bit ciphertext 805, the output data 615 from the JSALE LDPC encoder 610 is the 256 bits of ciphertext 805. In other embodiments wherein the transmitter 601 transmits less than all of 256-bit ciphertext 805, the output data 615 is not identical to the 256-bit encoded ciphertext 805 because the 256 bits of ciphertext 805 generated by the JSALE LDPC encoder 610 are punctured before being outputted from the JSALE LDPC encoder 610 as the output data 615. In certain embodiments, 16×8×4 bits (0000 indicates disable)=512 bits out of them only max of (8×8×4) 256 bits are all nonzero (lower triangular and Wr=8).

In certain embodiments, the size of the encryption key is constant such as 128 bits, for example, for layers subsequent to the first layer the systematic data {"Si−1,0" . . . "Si−1,7"} from the previous layer is punctured at a puncture rate Rpunc such that keys 802b-o are added to a same number of columns (i.e., 128 bits) per row. The first key 802a has 128-bit key length for the first round (Round i=0).

The JSALE encryption QC-LDPC H-Matrix cyclic-shift values can be kept secret or otherwise secure from devices not intended to receive the JSALC cyrptcoded data, as well, as the puncturing pattern can be kept secret. The encryption key is transferred between the transmitter 601 and receiver 602 over a secure channel. The size of the encryption key varies between 128 bits to 256 bits, for example, for layers subsequent to the first layer an increasing key size is also added to the parity part of the H-Matrix, and the key length increases incrementally per row. The first key 802a has 128-bit key length for the first round (Round i=0).

Figures 9, 10:
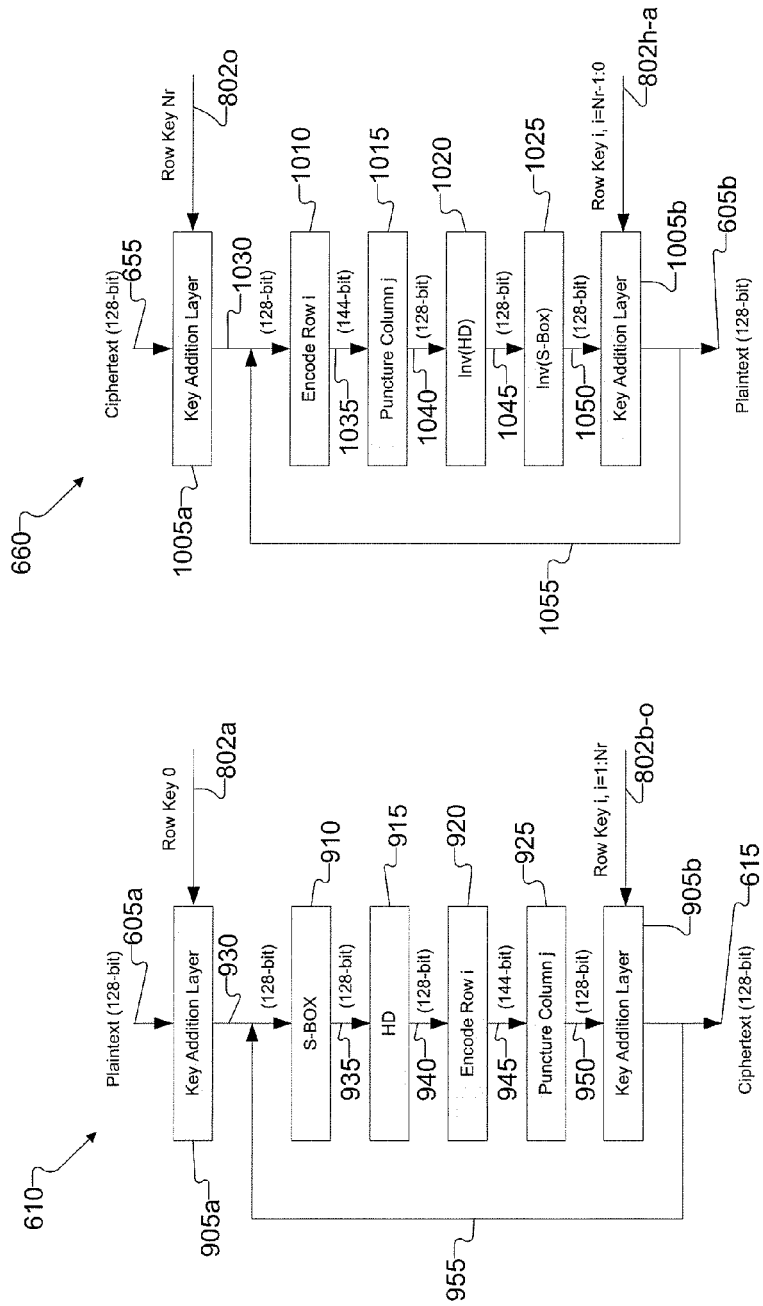
FIG. 9 illustrates a flowchart of the hardware implementation of the JSALE LDPC encoder 610 for according to this disclosure.
FIG. 10 illustrates a flowchart of the hardware implementation of the of the JSALE LDPC decoder according to this disclosure.

FIG. 9 illustrates a flowchart of the hardware implementation of the JSALE LDPC encoder 610 for according to the embodiments of the present disclosure. The embodiment of the encoder 610 shown in FIG. 9 is for illustration only. Other embodiments could be used without departing from the scope of the present disclosure.

The JSALE encryption/decryption flowcharts in FIGS. 9 and 10 show respective encryption/encoding and decryption/decoding examples for the case of Rpunc=½(Re=1), Nr=8. In each LDPC encoding row 1≤i≤8, the encoded data is appended by a new parity column. The encoded data is then punctured by column 1≤j≤8 before the next key addition, yielding a maintaining of the entire process as 128-bit based. In the case of $$Rpunc = \frac{1}{2}(i.e, Re = 1),$$

the JSALE decryption/decoding hardware processes in a backward order of the encryption from last row to first row. The decryption/decoding can be processed as hard decision. The advantage of Rpunc=½(Re=1) JSALE encryption is that the decryption requires only a single LDPC decoding iteration to recover the plaintext. The disadvantage of processing at rate Rpunc=½(Re=1) is that it has no error resilience. However, in certain implementations, such as transmissions over a clear channel, the foregoing error resilience is not a disadvantage, especially in light of the technical advantages of the high effective rate (Re=1).

The JSALE LDPC encoder 610 implements the JSALE encryption process 801 described above in reference to FIG. 8. The JSALE LDPC encoder 610 includes key addition layer processing block 905a, 905b, an S-Box 910 processing block, an HD processing block 915, an encoding block 920, and a column puncture processing block 925. For simplicity, according to the embodiments of the present disclosure, the byte substitution block and S-Box LUT are together referred to as the "S-BOX." Note that the components 905a, 905b, and 910 can be the same as or similar to the respective components 411a, 411b, and 412 of the AES standard encryption block of FIG. 4.

In the first round, the row key index (i) is set to zero. The key addition layer 905a receives the 128-bit plaintext 605a, adds the first key 802a (Row Key 0) to the plaintext 605a by applying an XOR function to the plaintext 605a and the key 802a, and outputs 128-bits of data 930. For example, the data 930 can be similar to the data 416a output from the key addition module 411a of the standard AES 410 shown in FIG. 4. In response to receiving the 128-bits of data 930, the S-BOX 910 outputs a non-linearly corresponding 128-bit data 935 from the S-BOX LUT. For example, the S-BOX LUT associated with the S-BOX 910 can be similar to the LUT 413 shown in FIG. 4, also, the 128-bit data 935 can be similar to the data 417 output from the byte substitution block 412 of the standard AES 410. In response to receiving the 128-bit data 935, the HD block 915 applies a low complexity high diffusion function having an HD value of $4^9$ or above that mixes the columns according to a column permutation, and outputs a 128-bit data 940. For this first round, the 128-bit data 940 represents the systematic part of Layer 1 of the H-matrix 800, namely, {S0,0 . . . S0,7}. In response to receiving the to the 128-bit data 940, the encoder 920 generates 16 parity bits (i.e., the submatrix S0,8) based on the 128-bits of data 940 and the H-matrix 700, concatenates the newly generated parity submatrix S0,8 to the 128-bit data 940, and outputs the 144-bit data 945.

In embodiments of the encoder 610 without a column puncture block 925, the 144-bit data 945 is the output of the first round, namely, {S0,0 . . . S0,8}. The next round (i.e., the second round) begins at key addition layer 905b that receives the 144-bit cryptcoded data 945, increments the row key index by one (i.e., i++), adds the next key 802b (Row Key i) to the cryptcoded data 945, and outputs 144-bits of data 955 to the S-BOX 910 for processing the second round of cryptcoding. That is, in embodiments of the encoder 610 without a puncture block 925, the encoder 610 generates two bits ciphertext 805 for every bit of plaintext data 605a received, which corresponds to an effective code rate of Re=¼ because the SLCC encoder 630 generates two-bits of encoded blocks 635t for every bit in the ciphertext 615. When the encoder 610 does not puncture, the complementary puncture rate (R̄punc) is less than the basic code rate (R) of the H-matrix, yielding a non-puncture effective code rate (Re) that is less than the basic code rate (Re<R).

In certain embodiments of the encoder 610 with the column puncture block 925, output of the first round is the data 950 that is output from the column puncture block 925. The column puncture block 925 enables the transmitter 601 to adjust the effective code rate (Re) within a range of (1≥Re≥½) based on the puncture rate (Rpunc). That is, the encoder 610 generates two bits ciphertext 805 for every bit of plaintext data 605a received according to the H-matrix 700 basic code rate (R=½) (i.e., R is distinguished from the final effective code rate Re). The column puncture block 925 punctures or otherwise removes a subset or portion of bits from the encrypted data 945, thereby preventing the SLCC encoder 630 from receiving the subset of bits punctured out of the 256-bit ciphertext 805a. The SLCC encoder 630 generates 1/Rs bits (i.e., 2-bits for Rs=½) of encoded blocks 635t for every bit in the punctured, reduced length ciphertext 615. As the punctured ciphertext 615 has a bit length that is less than 256-bits, the encoded blocks 635t includes a number of bits within the range of [256>($Z_p \times R_s \times 256$)>128]. In the first round, the column puncture block 925 receives the output data 945, sets the column index (j) to zero, punctures Column j, and outputs punctured data 950. The punctured data 950 has a bit length of (Rpunc×128) of bits, for example, when Rpunc=⅝, the data 950 has a bit length of 128-bits. The column puncture block 925 of the encoder 610 implements a complementary puncture rate (R̄punc) that is greater than or equal to the basic code rate (R) of the H-matrix and less than one (R≤R̄punc≤1), as a result, yielding a partial-puncture effective code rate greater than a basic code rate and less than one (R≤Re≤1).

In certain embodiments of the encoder 610 with the column puncture block 925, the next round (i.e., the second round) begins at key addition layer 905b. For processing rounds subsequent to the first round, the key addition layer 905b receives the (Rpunc×128) bits of punctured 128-bit data 950, increments the row key index by one (i.e., i++), adds the next key 802b (Row Key i) to the 128-bit data 950, and outputs 128 bits of data 955 to the S-BOX 910 for processing the second round of cryptcoding. That is, in embodiments of the encoder 610 including the puncture block 925, the encoder 610 generates less than two bits of ciphertext 805 for every bit of plaintext data 605a received, which corresponds to an effective code rate in the range of 1≥Re>½ because the SLCC encoder 630 generates 1/Rs bits of encoded blocks 635t for every bit in the ciphertext 615.

The column puncture block 925 stores the puncture pattern that is common the decoder 660. Various puncture patterns can be used as along as both the transmitter 601 and receiver 602 use the same puncture pattern for the same plaintext data 605a.

The HD 915 function is flexible and can be calculated through simple linear binary operations simpler than the MixColumn function in AES. (See REF7). In certain embodiments, the HD 915 can apply a non-binary operation. In the HD 915 function, the natural diffusion of the 256-bit LDPC derived from the minimum distance of the code is added to the overall diffusion calculation of the JSALE. The natural diffusion of the 256-bit LDPC can be designed to $d_{min} \geq 16=4^2$. Hence, the overall JSALE diffusion for 8 rows is $Rp=4^8=4^{10}$ which is four times higher than AES-128 diffusion of $4^9$. As a result of using the JSALE method, the security level of the encryption increased to be even higher than AES-128 with $Rp=4^{10}$. The Quasi-Cyclic LDPC row encoding process replaces the ShiftRow block 414 of the AES 410.

FIG. 10 illustrates a flowchart of the hardware implementation of the of the JSALE LDPC decoder 660 according to the embodiments of the present disclosure. The embodiment of the encoder 610 shown in FIG. 9 is for illustration only. Other embodiments could be used without departing from the scope of the present disclosure.

The JSALE LDPC decoder 660 includes two key addition layers 1005a, 1005b, an decoder block 1010, a column puncture block 1015, an inverse HD block 1020, and an inverse S-Box 1025. The JSALE LDPC decoder 660 deciphers the 128-bit ciphertext 655 using a Quasi-Cyclic (QC) LDPC Layered decoder that decodes the ciphertext 655 sequentially. The JSALE LDPC decoder 660 performs key addition layer 1005a, inverse high diffusion 1020, and inverse nonlinear byte substitution operations 1025 between the rows. The JSALE LDPC decoder 660 uses the same H-Matrix that the JSALE LDPC encoder 610 uses. The JSALE LDPC decoder 660 supports multiple key lengths such as AES-128, AES-192, and AES-256.

More particularly, the decoder 660 receives the 128-bit ciphertext 655 for a first round (Round Nr) at the key addition layer 1005a, which applies the Row Key Nr to the ciphertext 655 using a function such as an inverse XOR function to recover the parity bits of the last layer the H-matrix 800 which are output to the decoder block 1010 as 128-bit data 1030.

The JSALE decoder 660 receives a soft decision Log Likelihood Ratio (LLR) data 655 from the SLCC decoder 640 output for error correction. The soft decision LLR input input to the JSALE decoder 660 has a multi-bit precision, and the soft input decryption process yield an effective code rate the is less than 1 (Re<1). Also, adding errors in the transmitter side that will be punctured in the receiver. Hence, all punctured bits are set to all "0" (neutral value) while the key addition layer 1005a-b, inverse S-Box 1025, and the inverse HD linear function 1020 are processed on the soft data 655. The LLR of the inverse S-Box 1025 decryption ($S^{-1}$) input bits with i∈[0 . . . 7] can be expressed by Equation 1.

$$L_{b_i} = \ln\left(\frac{p(b_i = +1 \mid y_i)}{p(b_i = -1 \mid y_i)}\right) = \ln\left(\frac{p(y_i \mid b_i = +1)}{p(y_i \mid b_i = -1)}\right) + \ln\left(\frac{p(b_i = +1)}{p(b_i = -1)}\right) \quad (1)$$

In Equation 1, the output bits $L_{q_j}$ from the inverse S-box 1025 are express by Equation 2 wherein S is invertible such that $k=S(S_k^{-1})$ and $j \in [0 \ldots 7]$, and K=256, and $b_i$, $q_j$ have equi-probability for −1, and +1.

$$L_{q_j} = \ln\left(\frac{p(y_{0\ldots 7} \mid q_j = +1)}{p(y_{0\ldots 7} \mid q_j = -1)}\right) = \ln\left(\frac{\sum_{k=0}^{K-1} p(y_{0\ldots 7} \mid S_k^{-1} \mid q_j = +1)}{\sum_{k=0}^{K-1} p(y_{0\ldots 7} \mid S_k^{-1} \mid q_j = -1)}\right) = \ln\left(\frac{\sum_{k=0}^{K-1} \prod_{i=0}^{7} p(y_i \mid S_k^{-1} \mid q_j = +1)}{\sum_{k=0}^{K-1} \prod_{i=0}^{7} p(y_i \mid S_k^{-1} \mid q_j = -1)}\right) \quad (2)$$

-continued $$= \ln\left(\frac{\sum_{k=0}^{K-1}\prod_{i=0}^{7}p(y_i \mid b_{0...7,k} \mid q_j = +1)}{\sum_{k=0}^{K-1}\prod_{i=0}^{7}p(y_i \mid b_{0...7,k} \mid q_j = -1)}\right)$$

$$= \ln\left(\frac{\sum_{k=0}^{K-1}e^{L(b_{0...7,k})}\Big|q_j = +1}{\sum_{k=0}^{K-1}e^{L(b_{0...7,k})}\Big|q_j = -1}\right)$$

$$= \ln\left(\frac{\sum_{k=0}^{K-1}e^{\sum_{i=0}^{7}L(b_{i,k})}\Big|q_j = +1}{\sum_{k=0}^{K-1}e^{\sum_{i=0}^{7}L(b_{i,k})}\Big|q_j = -1}\right)$$

$$= \max_k *\left(\sum_{i=0}^{7}L(b_{i,k})\Big|q_j = +1\right) - \max_k *\left(\sum_{i=0}^{7}L(b_{i,k})\Big|q_j = -1\right)$$

In Equation 2, $L(b_{i,k}) = L_{b_i}[S(k)]_i$ and $$\max_k *(x(k)) = \max_k(x(k)) + \ln\left(1 + \sum_{k \neq m}e^{x(k)-x(m)}\right), \quad m = \operatorname{argmax}_k(x(k)),$$

and $k \in \{0 \ldots 255\}$.

Figure 11:
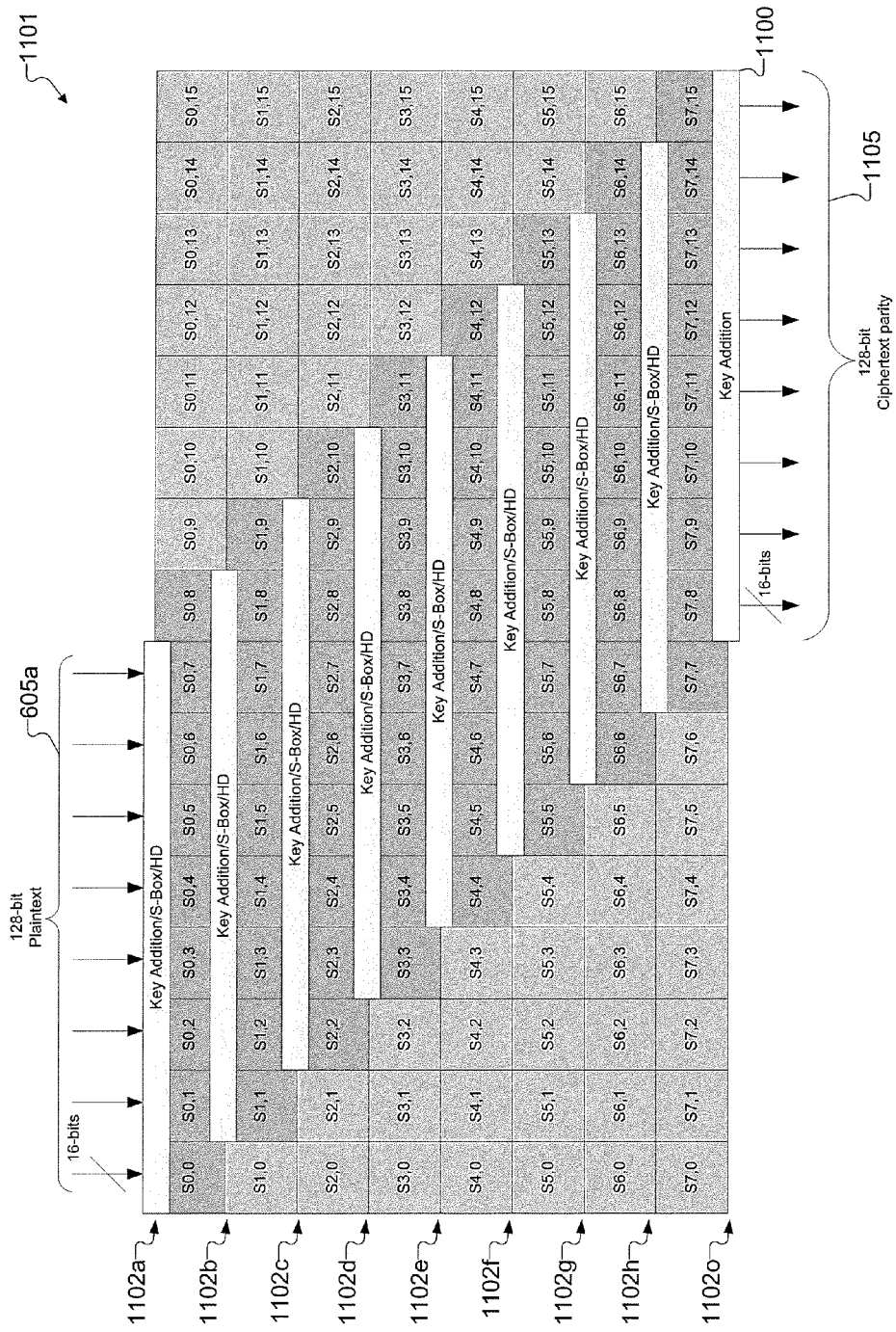
FIG. 11 illustrates an LDPC H-Matrix for the JSALE encryption process implemented by a JSALE LDPC encoder/decoder having a puncturing rate that is equal to the basic code rate according to this disclosure.

FIG. 11 illustrates an LDPC H-Matrix 1100 for the JSALE encryption process 1101 implemented by a JSALE LDPC encoder/decoder 610, 660 having a puncturing rate that is equal to the basic code rate (½) according to embodiments of the present disclosure. The embodiment of the JSALE process 1101 shown in FIG. 11 is for illustration only. Other embodiments could be used without departing from the scope of the present disclosure. The LDPC H-Matrix 1100 is similar to the H-Matrix 800 and can be based on the H-matrix 700 of FIG. 7A.

The JSALE process 1101 is special case in which the puncture rate is Rpunc=½ which corresponds to no rate reduction and a final effective code rate of (Re=1). JSALE process 1101 punctures the data in every row of encoding and maintains the encoded size 128-bit throughout the encryption process. The JSALE process 1101 implementing a complementary puncture rate ($\overline{\text{Rpunc}}$) that is equal to a basic code rate of the H-matrix yields a full puncture effective code rate equal to one (Re=1). For example, when Rpunc=½, then also $\overline{\text{Rpunc}}$=½ and Re=1.

FIG. 12 illustrates an example of the JSALE Encryption/Decryption H-Matrix in the case of (Re=1). The gray shaded entries are excluded from the encoding process. The encryption process starts at row i=1. After the encoder applies key addition, S-Box and HD operations to the systematic data (columns 1-8) of row i=1, the result generated is parity column 9 (orange color). Then, according to a non-sequential puncture pattern, at the end of the first round, column j=3 is punctured for the rest of the process.

The next round of encoding begins when the non "−1" entries of data for row i=2 are processed through the key addition, S-Box and HD operations. The row i=2 encoding data (in columns 1,2, and 4-9) is processed yielding column 10 parity (shown as the submatrix represented by the number "14"). Then, at the end of the first round, column j=8 is punctured and so on for (row, column) pairs: (3,6), (4,2), (5,7), (6,1), (7,4), (8,5).

The 128-bit ciphertext output from the JSALE process 1101 is outputted from columns 9-16 (8×16=128-bit) of the last row i=8. The decryption/decoding JSALE process 1101 is performed the same way but in reverse row order. Row i=8 encoder yields column 5 (shown as the submatrix represented by the number "4") and punctures column j=16. Row i=7 encoder yields column 4 (shown as the submatrix represented by the number "10") and punctures column j=15 and so on.

Figure 13:
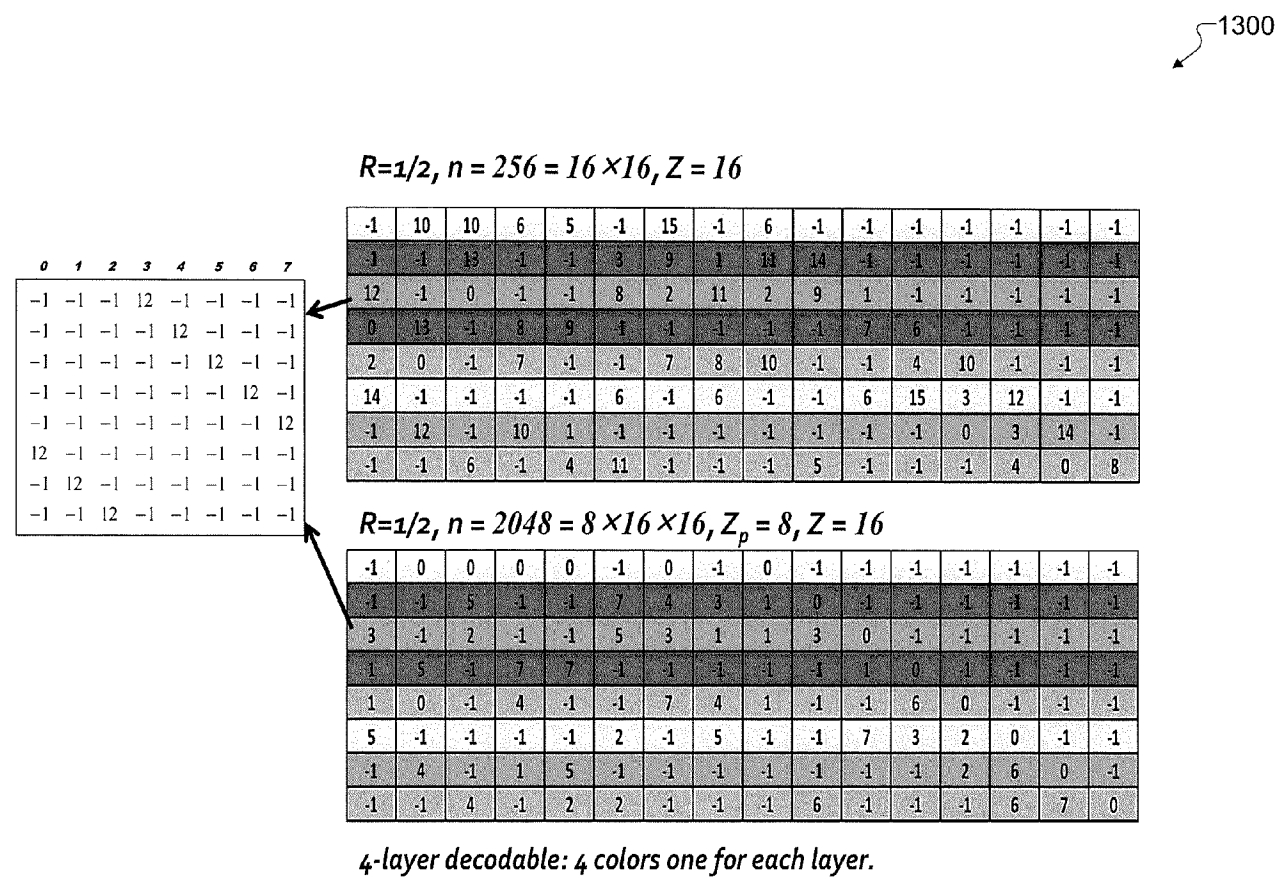

FIG. 13 illustrates an example of a Hierarchical-Z H-matrix method according to embodiments of the present disclosure. The Hierarchical-Z H-matrix method 1300 is for illustration only. Other embodiments could be used without departing from the scope of this disclosure.

The Hierarchical-Z H-matrix method 1300 uses a JSALE and SLCC H-Matrix structure for Rs=½. The upper H-Matrix structure is related to the JSALE 256-bit Rate ½ LDPC code as described in reference to FIGS. 9-10. The 256-bit H-Matrix that consists of 8 rows and 16 columns is then lifted again with Zp=8 to support 2048-bit SLCC code. The hierarchical lifting process and the decoding reuse are based on REF79, which helps maintain the same H-Matrix characteristics as the JSALE code while reusing its decoder hardware for channel coding.

The JSALC (JSALE+SLCC) performance can be further optimized based on the channel characteristics, the SLCC structure (code rate, etc.), and JSALE LDPC code structure to support a tradeoff between the allowed t≥0 bit errors in the JSALE decoder input (bit errors occurred in the channel and/or the SLCC decoder that were NOT corrected by the SLCC decoder and passed to the JSALE decoder input) with the total JSALE code rate Re. For example, if the tradeoff t≠0 bit errors for the SLCC decoder output and the JSALE decryption input, then the result is a reduction in Zp SLCC code and a lower complexity (i.e., reduced number of iterations) SLCC decoder. However, in some cases, an increase to the JSALE decoder complexity (i.e. increased number of iterations) is needed to recover the plaintext. In addition, code puncturing may increase the decoding complexity, especially when a non-linear function (i.e., S-Box) is embedded in the code. An alternative solution is to reduce the JSALE code rate Re (reduce Rpunc) and maintain the JSALE decoder complexity to be low. In addition, the R=½ 8×16 H-Matrix structure can be used for different block sizes (i.e. WiGig—672-bit, etc.), while changing the size of the lifting factor Z (i.e. 42) for both the JSALE and the SLCC. Increasing the lifting factor Z may increase the minimum distance and the overall JSALE diffusion and enable higher code rate (Re).

The security level of the JSALC scheme can be measured by the JSALC resistance to cryptanalysis. The JSALC resistance to differential cryptanalysis is based on a chosen plaintext attack. Differential cryptanalysis is based on tracking and trailing the differences between pairs of plaintexts over the rounds as they transform to ciphertexts. For an n-bit non-linear function, the probability threshold to reach differential uniformity (cryptanalysis complexity is equal to the brute force $O(2^n)$) can be expressed as $T_d=2^{(n-1)}$. In the JSALC system, as in AES, n=128. The S-Box blocks of the AES standard can be used in the JSALC system, where the maximum differential probability is $4/256=2^{-6}$. The HD linear transformation has a branch factor of 5 (between rounds) which results with total of $(2^{-6})^{40}=2^{-240}$ maximum differential probability after 8 rounds. The total calculated maximum differential probability $2^{-240} \ll T_d=2^{-127}$ which means that the JSALC system, using the S-Box and HD functions as defined in AES, has reached the differential uniformity and is immune to differential attacks to the same level as brute force attacks with complexity $O(2^{128})$. These measurement results also confirm that a much lower complexity S-Box and HD than as defined in the AES standard of REF7 can achieve the same threshold T (for example, S-Box degree can be reduced from 8 to 4). The same can be applied to linear cryptanalysis which is a referred to as a plaintext attack that uses the linearity of the cipher to recover the key. The linear uniformity threshold is defined as the probability of input-output correlation $T_1=2^{-1/2}$. The maximum AES S-Box input-output correlation is $\frac{1}{8}=2^{-3}$. Hence, after 8 rounds the total maximum linear probability is $(2^{-3})^{40}=2^{-12}$ $0 \ll T_1=2^{-64}$. The result also confirms that reduced complexity S-Box and HD functions can be applied in JSALC to reach the same resistance level as AES. The security level of the JSALC scheme can be measured by for resilience against square attacks which are chosen plaintext attacks on byte-based ciphers. The JSALC system using the JSALE LDPC code is more resistant to square attacks than AES, because, unlike the AES standard, the JSALC system including the JSALE LDPC code is a bit-based cipher system.

Figure 14:
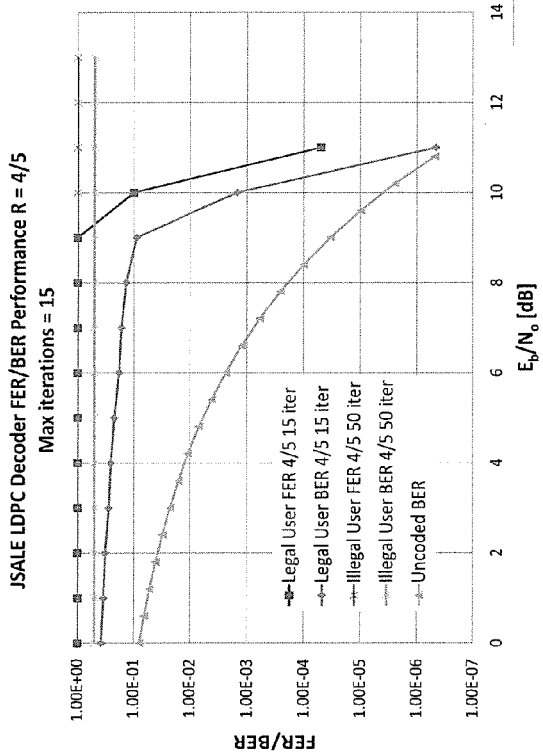
FIG. 14 illustrates JSALE bit error rate (BER)/frame error rate (FER) performance.

FIG. 14 illustrates JSALE bit error rate (BER)/frame error rate (FER) performance. The FER/BER performance results of JSALE LDPC decoder for two different scenarios are shown. In a first scenario represents a legitimate intended user with Re=⅘ and 15 iterations is shown. In the second scenario, legitimate intended user (shown as a legal user) with Re=⅘ and 50 iterations is shown. The LDPC decoder used is a layered decoder as described in REF34. The QPSK uncoded BER performance is also shown for comparison.

While the LDPC FER performance for an illegitimate hacker (shown as illegal user) is kept to FER=1 regardless of the SNR, the LDPC decoding FER performance for a legitimate intended user with Re=⅘ and 15 iterations is already smaller than 10E-4 for $E_b/N_0 \geq 11$ dB.

As explained above, the JSALE LDPC encoder rate is R=½, hence the input data is packed in blocks of 128-bit to provide 256-bit encoded data. The H-matrix used for the JSALE LDPC encoder and decoder is the same as described in reference to FIG. 8, where the secondary lifting factor Zp=1. The 256-bit encoded output block is then punctured at rate Rpunc to provide a final rate of Re=R/(1−Rpunc). The data is then fed into the Tx QPSK modulator and sent to the receiver through the Additive White Gaussian Noise (AWGN) channel. The signal received at the Rx input is QPSK demodulated and then de-punctured to recover the 256-bit received Log-Likelihood Ratio (LLR) input for the R=½ 256-bit LDPC decoder. As an example, the LLR soft data outputted from the SLCC decoder is AWGN.

Figure 15:
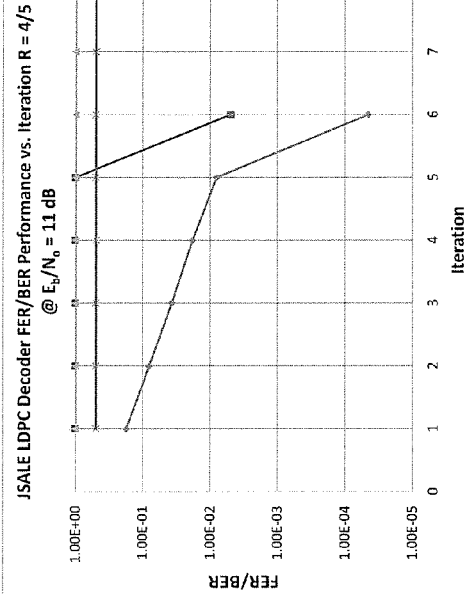
FIG. 15 illustrates the JSALE FER/BER performance with respect to the JSALE decoding number of iterations at Re=⅘ and $E_b/N_0$=13 dB.

FIG. 15 illustrates the JSALE FER/BER performance with respect to the JSALE decoding number of iterations at Re=⅘ and $E_b/N_0$=13 dB. The JSALE LDPC decoder FER performance is maintained close to 1 for all iterations smaller than 6. Then on the $6^{th}$ iteration the FER performance becomes lower than 10E-2. Due to the puncturing and S-Box, multiple iterations are required to correctly recover the plaintext. Hence, even if the SLCC decoder does not converge to error-free blocks, the JSALE decoder can still correct the errors with increased number of iterations (as explained above).

Figure 16:
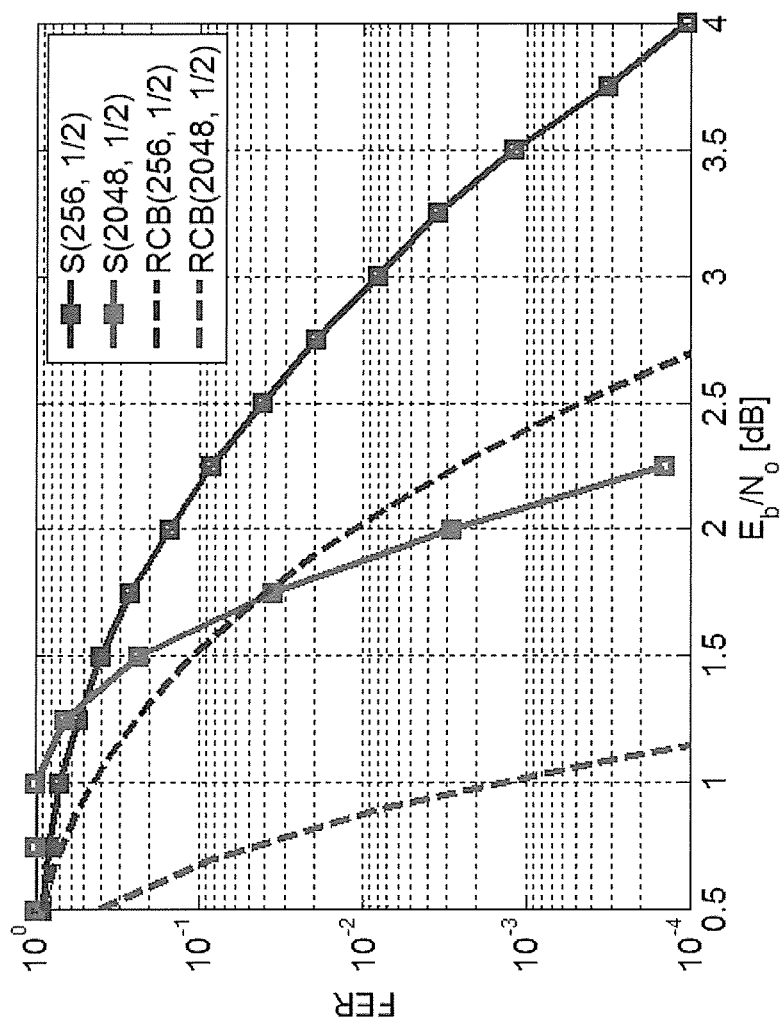
FIG. 16 illustrates the SLCC decoder performance with Zp=8 (2048-bit) compared to JSALE decoder with Zp=1 (256-bit).

FIG. 16 illustrates the SLCC decoder performance with Zp=8 (2048-bit) compared to JSALE decoder with Zp=1 (256-bit) as described in FIG. 14. The FER performance is compared between the two and to the theoretical Random Coding Bound (RCB) for each block size. The increased 2048-bit block size SLCC decoder has 1.75 dB better FER performance over the 256-bit block decoder at FER=10E-4. This result shows that in the SLCC code supports bigger blocks sizes (over 1000-bits) that do not always align with the encryption blocks having 128-bits.

The result also shows that if we select to maintain the low block sizes LDPC codes we would lose more than 1.5 dB FER performance which translates to lower data rate for the same SNR or higher SNR required to get the same data rate. Both the 2048-bit and the 256-bit LDPC decoder FER performances are still about 1 dB worse than the corresponding RCB performances. The reason for the 1 dB gap from the RCB is the quasi-cyclic format of the LDPC code that puts the code in a more regular form to reduce implementation complexity, thus significantly reducing the LDPC encoder/decoder power consumption.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A joint security advanced low density parity check (LDPC) encryption (JSALE) encoder comprising:
   a memory configured to store information bits representing plaintext input data inputted to the JSALE encoder;
   processing circuitry configured to encrypt and encode the information bits into ciphertext, the processing circuitry configured to:
      initiate a first round of Nr rounds of a JSALE process by applying a first encryption to the information bits, wherein Nr is a positive integer;
      generate parity bits of a current layer of an H-matrix by processing the encrypted information bits through an LDPC encoding process;
      generate and output a cryptcoded data by appending the parity bits to the encrypted information bits; and
      initiate each subsequent round of the JSALE process through the Nr round and to output the ciphertext after the Nr round.

2. The JSALE encoder of claim 1, wherein the processing circuitry is further configured to receive the cryptcoded data, puncture a subset of bits from the cryptcoded data according to a puncture rate (Rpunc) and a complementary puncture rate ($\overline{\text{Rpunc}}$), and output the remaining bits of the cryptcoded data.

3. The JSALE encoder of claim 2, wherein the complementary puncture rate ($\overline{\text{Rpunc}}$) is one of:
   less than a basic code rate of the H-matrix, yielding a non-puncture effective code rate less than the basic code rate (Re<R), and
   greater than or equal to a basic code rate of the H-matrix and less than one, yielding a partial-puncture effective code rate greater than a basic code rate and less than one (R≤Re<1).

4. The JSALE encoder of claim 2, wherein the complementary puncture rate ($\overline{\text{Rpunc}}$) is equal to a basic code rate of the H-matrix, yielding a full puncture effective code rate equal to one (Re=1).

5. The JSALE encoder of claim 4, wherein the processing circuitry is further configured to puncture according to a non-sequential puncture pattern.

6. The JSALE encoder of claim 1, wherein the first encryption and each of the subsequent rounds of encryption comprise AES keys that have a length of at least 128 bits.

7. The JSALE encoder of claim 1, wherein the processing circuitry is further configured to output a second data that nonlinearly corresponds to encrypted input data inputted;

mix columns of the second data according to a column permutation; and output highly diffused second data using a high diffusion (HD) module.

8. The JSALE encoder of claim 7, wherein the processing circuitry is HD module is characterized by a low complexity high diffusion value that is greater than or equal to an Advanced Encryption Standard (AES) value of $4^9$.

9. The JSALE encoder of claim 1, wherein the JSALE encoder is configured to couple to a Security LDPC Channel Coding (SLCC) encoder that shares a same H-Matrix structure with the JSALE encryption, the SLCC encoder configured to create a final Zp×256-bit block using a second level lifting factor (Zp) that lifts a 256-bit length by the Zp, wherein Zp is a positive integer.

10. The JSALE encoder of claim 1, wherein to initiate each subsequent round, the processing circuitry is further configured to:
  increment a round index by one for each round through the Nr round,
  apply a round specific encryption layer to bits of the cryptcoded data of a previous round, and
  send encrypted cryptcoded data of the previous round as encrypted input data of a current round.

11. A joint security advanced low density parity check (LDPC) encryption (JSALE) method comprising:
  initiating, by processing circuitry, a first round of Nr rounds of a JSALE process by applying a first encryption layer to a plaintext input data inputted to the processing circuitry from a memory, wherein Nr is a positive integer;
  generating, by the processing circuitry, parity bits of a current layer of an H-matrix by processing the decrypted input data through an LDPC encoding process, and
  generating and outputting, by the processing circuitry, a cryptcoded data by appending the parity bits to the decrypted input data; and
  initiating, by the processing circuitry, each subsequent round of the JSALE process through the Nr round and outputting a ciphertext after the Nr round.

12. The JSALE method of claim 11, further comprising:
  receiving the cryptcoded data; and
  puncturing a subset of bits from the cryptcoded data according to a puncture rate (Rpunc) and a complementary puncture rate ($\overline{Rpunc}$),
  wherein the bits of the cryptcoded data of a previous round are the remaining bits of the cryptcoded data.

13. The JSALE method of claim 12, wherein the complementary puncture rate ($\overline{Rpunc}$) is less than a basic code rate of the H-matrix, yielding a non-puncture effective code rate less than the basic code rate (Re<R).

14. The JSALE method of claim 12, wherein the complementary puncture rate ($\overline{Rpunc}$) is greater than or equal to a basic code rate of the H-matrix and less than one, yielding a partial-puncture effective code rate greater than a basic code rate and less than one (R≤Re<1).

15. The JSALE method of claim 14, further comprising puncturing according to a non-sequential puncture pattern.

16. The JSALE method of claim 12, wherein the complementary puncture rate ($\overline{Rpunc}$) is equal to a basic code rate of the H-matrix, yielding a full puncture effective code rate equal to one (Re=1).

17. The JSALE method of claim 11, wherein the first encryption and each of the subsequent rounds of encryption comprise AES keys that have a length of at least 128 bits.

18. The JSALE method of claim 11, further comprising:
  in response to receiving encrypted input data by a byte substitution module, outputting a second data that nonlinearly corresponds to encrypted input data;
  in response to receiving the second data, mixing, by a high diffusion (HD) module, columns of the second data according to a column permutation and outputting the second data.

19. The JSALE method of claim 18, wherein the HD module is characterized by a low complexity high diffusion value that is greater than or equal to an Advanced Encryption Standard (AES) value of $4^9$.

20. The JSALE method of claim 11, further comprising:
  sharing, by a Security LDPC Channel Coding (SLCC) encoder, a same H-Matrix structure with the JSALE encryption, and
  creating, by the SLCC encoder, a final Zp×256-bit block using a second level lifting factor (Zp) that lifts a 256-bit length by the Zp, wherein Zp is a positive integer.

21. The JSALE method of claim 11, initiating each subsequent round includes:
  incrementing a round index by one for each round through the Nr round,
  applying a round specific encryption layer to bits of the cryptcoded data of a previous round,
  sending encrypted cryptcoded data of the previous round as encrypted input data of a current round, and
  after initiating the Nr round, outputting the ciphertext after the Nr round.

22. A joint security advanced low density parity check (LDPC) decryption (JSALE) decoder for decrypting and decoding a ciphertext received from a JSALE transmitter that has common H-matrix cyclic shift values and common encryption keys, the JSALE decoder comprising:
  a memory configured to store information bits representing the ciphertext;
  processing circuitry configured to decrypt and decode the information bits into plaintext data, the processing circuitry configured to:
    initiate a first round of Nr rounds of a JSALE process by applying a first decryption to the information bits to output a cryptcoded data, wherein Nr is a positive integer, and wherein the cryptcoded data of the first round is a last layer of the H-matrix, and wherein the cryptcoded data includes systematic bits of the last layer of the H-matrix appended to parity bits of the last layer of the H-matrix;
    extract the parity bits of a current layer of the H-matrix from the cryptcoded data inputted; and
    initiate each subsequent round of the JSALE process through the Nr round and to output the plaintext data after the Nr round.

23. The JSALE decoder of claim 22, wherein the processing circuitry is further configured to:
  generate highly diffused systematic bits of the current layer of the H-matrix by processing the extracted parity bits of the current layer of the H-matrix through an LDPC decoding process;
  generate and output the highly diffused systematic bits and the extracted parity bits as third data;
  unmix columns of the third data according to a column permutation and output the unmixed third data as a second data; and
  output a keyed plaintext data of a current round that nonlinearly corresponds to the second data inputted.

24. The JSALE decoder of claim 23, wherein to initiate each subsequent round, the processing circuitry is further configured to:
- decrement a round index by one for each round through the Nr round,
- apply a round specific decryption key to bits of the plaintext data of a previous round, and
- send a decrypted plaintext data of the previous round to as cryptcoded data of a current round.

25. The JSALE decoder of claim 23, wherein the processing circuitry is further configured to receive the third data, puncture a subset of bits from the third data according to a puncture rate (Rpunc) and a complementary puncture rate ($\overline{\text{Rpunc}}$), and output the remaining bits of the third data to an inverse high diffusion (HD) module.

26. The JSALE decoder of claim 25, wherein the inverse HD module is characterized by a low complexity high diffusion value that is greater than or equal to an Advanced Encryption Standard (AES) value of $4^9$.

27. The JSALE decoder of claim 22, wherein the first decryption and each of the subsequent rounds of decryption comprise AES keys that have a length of at least 128 bits.

28. The JSALE decoder of claim 22, further comprising a decision buffer configured to generate a log-likelihood ratio (LLR) input that is one of:
- a soft decision including a multi-bit precision, and
- a hard decision including a single bit precision,
- wherein the JSALE decryption processing is soft when the LLR input includes the multi-bit precision and hard when the LLR input includes the single bit precision.

29. The JSALE decoder of claim 22, wherein the JSALE decoder is configured to couple to a Security LDPC Channel Coding (SLCC) decoder that shares a same H-Matrix structure with the JSALE decryption, the SLCC decoder configured to create a final $Zp \times 256$-bit block using a second level lifting factor (Zp) that lifts a 256-bit length by the Zp, wherein Zp is a positive integer.

* * * * *